United States Patent
Mesuda et al.

(10) Patent No.: US 12,191,494 B2
(45) Date of Patent: Jan. 7, 2025

(54) COMPOSITE PARTICLES FOR ELECTROCHEMICAL DEVICE AND METHOD OF PRODUCING SAME, BINDER COMPOSITION FOR ELECTROCHEMICAL DEVICE FUNCTIONAL LAYER AND METHOD OF PRODUCING SAME, CONDUCTIVE MATERIAL PASTE FOR ELECTRODE MIXED MATERIAL LAYER AND METHOD OF PRODUCING SAME, SLURRY FOR ELECTRODE MIXED MATERIAL LAYER, ELECTRODE FOR ELECTROCHEMICAL DEVICE, AND ELECTROCHEMICAL DEVICE

(71) Applicant: ZEON CORPORATION, Tokyo (JP)

(72) Inventors: Maki Mesuda, Tokyo (JP); Kenya Sonobe, Tokyo (JP); Yasuhiro Isshiki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 473 days.

(21) Appl. No.: 17/597,048

(22) PCT Filed: Jun. 17, 2020

(86) PCT No.: PCT/JP2020/023845
§ 371 (c)(1),
(2) Date: Dec. 23, 2021

(87) PCT Pub. No.: WO2020/262174
PCT Pub. Date: Dec. 30, 2020

(65) Prior Publication Data
US 2022/0238883 A1    Jul. 28, 2022

(30) Foreign Application Priority Data
Jun. 28, 2019 (JP) .................. 2019-122013

(51) Int. Cl.
*H01M 4/62* (2006.01)
*H01M 4/525* (2010.01)
*H01M 10/0525* (2010.01)

(52) U.S. Cl.
CPC ........... *H01M 4/622* (2013.01); *H01M 4/525* (2013.01); *H01M 4/625* (2013.01); *H01M 10/0525* (2013.01)

(58) Field of Classification Search
CPC ...... H01M 4/622; H01M 4/525; H01M 4/625; H01M 10/0525; H01M 4/131;
(Continued)

(56) References Cited

U.S. PATENT DOCUMENTS

| 9,564,638 | B2 | 2/2017 | Uemura | |
| 10,177,415 | B2 * | 1/2019 | Sasaki | .................... H01G 9/004 |

(Continued)

FOREIGN PATENT DOCUMENTS

| CN | 101838224 A | 9/2010 |
| CN | 103262305 A | 8/2013 |

(Continued)

OTHER PUBLICATIONS

Nov. 20, 2023, the Extended European Search Report issued by the European Patent Office in the corresponding European Patent Application No. 20832773.4.
(Continued)

*Primary Examiner* — Abdullah A Riyami
*Assistant Examiner* — Nader J Alhawamdeh
(74) *Attorney, Agent, or Firm* — KENJA IP LAW PC

(57) ABSTRACT

Provided is a novel technique relating to electrochemical devices that makes it possible to ensure a high level of safety of an electrochemical device while also causing the electrochemical device to display excellent high-temperature storage characteristics. One or more composite particles for an
(Continued)

electrochemical device each include a core particle and a shell portion at least partially covering an outer surface of the core particle. The core particle contains a melamine compound, and the shell portion contains an inorganic material.

22 Claims, 1 Drawing Sheet

(58) Field of Classification Search
CPC .... H01M 4/1391; H01M 4/366; H01M 4/583; H01M 4/602; H01M 4/621; H01M 4/62; H01M 10/052; H01G 11/36; H01G 11/48; H01G 11/50; H01G 11/42; H01G 11/86; H01G 11/38; Y02E 60/10
See application file for complete search history.

(56) References Cited

U.S. PATENT DOCUMENTS

| | | | | |
|---|---|---|---|---|
| 2016/0141581 | A1* | 5/2016 | Sasaki | H01M 10/0525 429/144 |
| 2017/0275506 | A1* | 9/2017 | Sasaki | H01G 11/78 |
| 2017/0358384 | A1 | 12/2017 | Kageyama et al. | |
| 2018/0043656 | A1* | 2/2018 | Song | H01M 50/491 |
| 2021/0184313 | A1 | 6/2021 | Asai et al. | |
| 2022/0238883 | A1* | 7/2022 | Mesuda | H01M 4/622 |

FOREIGN PATENT DOCUMENTS

| | | |
|---|---|---|
| CN | 205685866 U | 11/2016 |
| CN | 108047480 A | 5/2018 |
| CN | 108134044 A | 6/2018 |
| EP | 3588623 A1 | 1/2020 |
| JP | 2005171033 A | 6/2005 |
| JP | 2010015769 A | 1/2010 |
| JP | 2012004034 A | 1/2012 |
| JP | 2012204303 A | 10/2012 |
| JP | 2015050112 A | 3/2015 |
| JP | 2016130354 A | 7/2016 |
| WO | 2018155281 A1 | 8/2018 |
| WO | 2020040163 A1 | 2/2020 |

OTHER PUBLICATIONS

Aug. 18, 2020, International Search Report issued in the International Patent Application No. PCT/JP2020/023845.

Dec. 28, 2021, International Preliminary Report on Patentability issued in the International Patent Application No. PCT/JP2020/023845.

Jul. 18, 2023, the Partial Supplementary European Search Report issued by the European Patent Office in the corresponding European Patent Application No. 20832773.4.

\* cited by examiner

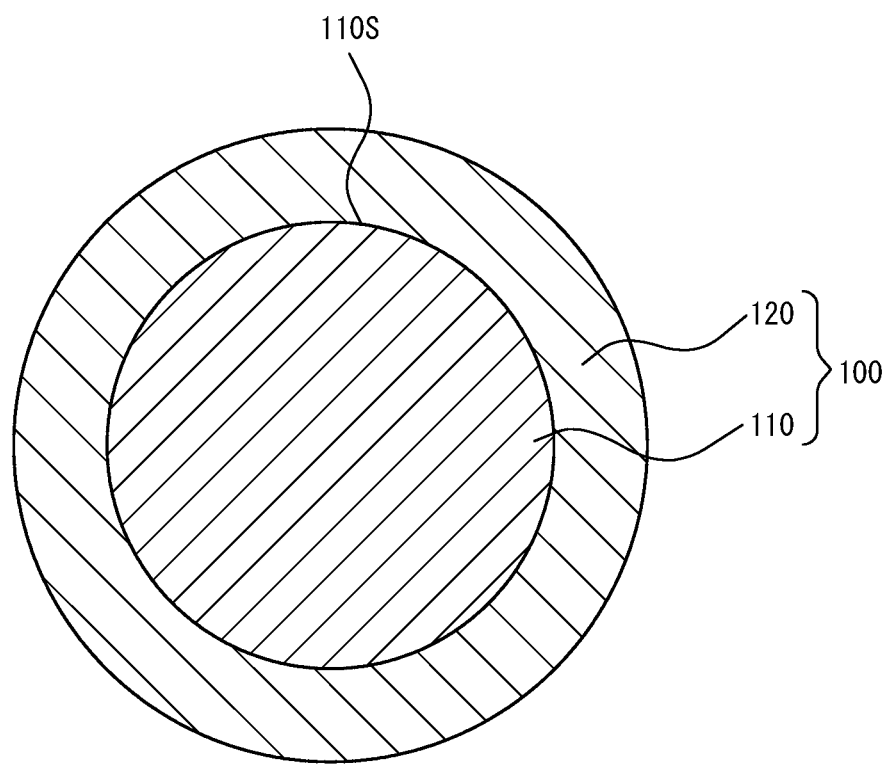

COMPOSITE PARTICLES FOR ELECTROCHEMICAL DEVICE AND METHOD OF PRODUCING SAME, BINDER COMPOSITION FOR ELECTROCHEMICAL DEVICE FUNCTIONAL LAYER AND METHOD OF PRODUCING SAME, CONDUCTIVE MATERIAL PASTE FOR ELECTRODE MIXED MATERIAL LAYER AND METHOD OF PRODUCING SAME, SLURRY FOR ELECTRODE MIXED MATERIAL LAYER, ELECTRODE FOR ELECTROCHEMICAL DEVICE, AND ELECTROCHEMICAL DEVICE

TECHNICAL FIELD

The present disclosure relates to composite particles for an electrochemical device and a method of producing the same, a binder composition for an electrochemical device functional layer and a method of producing the same, a conductive material paste for an electrode mixed material layer and a method of producing the same, a slurry for an electrode mixed material layer, an electrode for an electrochemical device, and an electrochemical device.

BACKGROUND

Electrochemical devices such as lithium ion secondary batteries, electric double-layer capacitors, and lithium ion capacitors have characteristics such as compact size, light weight, high energy-density, and the ability to be repeatedly charged and discharged, and are used in a wide range of applications. An electrochemical device typically includes device members such as a plurality of electrodes and a separator that isolates these electrodes from each other and prevents internal short-circuiting.

There are instances in which a member including a functional layer that contains a binder capable of imparting adhesiveness and optionally contains particles compounded in order to cause the member to display a desired function (hereinafter, referred to as "functional particles") is used as a device member of an electrochemical device.

Specifically, a separator that includes an adhesive layer containing a binder and/or a porous membrane layer containing a binder and non-conductive particles as functional particles on a separator substrate may be used as a separator of an electrochemical device. Moreover, an electrode that includes an electrode mixed material layer containing a binder and electrode active material particles as functional particles on a current collector or an electrode that further includes an adhesive layer and/or porous membrane layer such as described above on an electrode substrate including an electrode mixed material layer on a current collector may be used as an electrode of an electrochemical device.

Attempts are being made to improve device members in order to prevent thermal runaway caused by internal short-circuiting of electrochemical devices and ensure safety of electrochemical devices. As one example, Patent Literature (PTL) 1 proposes an electrode in which a conductive adhesive layer that contains a foaming agent having a foaming temperature of 140° C. or higher is disposed between an electrode mixed material layer and a current collector. In an electrochemical device that is assembled using the electrode proposed in PTL 1, it is possible to prevent abnormal heat release and ignition when an internal short circuit occurs because the foaming agent foams and releases incombustible gas.

CITATION LIST

Patent Literature

PTL 1: WO2018/155281A1

SUMMARY

Technical Problem

However, with regards to the conventional electrode described above, there has been demand for inhibiting reduction of capacity of an electrochemical device during long-term storage of the electrochemical device at high temperature. In other words, the conventional electrode described above leaves room for further improvement in terms of sufficiently ensuring safety of an electrochemical device while, on the other hand, improving high-temperature storage characteristics of the electrochemical device.

Accordingly, an object of the present disclosure is to provide a novel technique relating to electrochemical devices that makes it possible to ensure a high level of safety of an electrochemical device while also causing the electrochemical device to display excellent high-temperature storage characteristics.

Solution to Problem

The inventors conducted diligent investigation with the aim of solving the problem set forth above. Firstly, the inventors focused on using a melamine compound as a foaming agent. The inventors discovered that safety of an electrochemical device can be sufficiently ensured while also improving high-temperature storage characteristics of the electrochemical device by producing the electrochemical device using composite particles in which the outer surface of a melamine compound is partially or completely covered by an inorganic material. In this manner, the inventors completed the present disclosure.

Specifically, the present disclosure aims to advantageously solve the problem set forth above, and one or more presently disclosed composite particles for an electrochemical device each comprise: a core particle; and a shell portion at least partially covering an outer surface of the core particle, wherein the core particle contains a melamine compound, and the shell portion contains an inorganic material. By using composite particles having a core-shell structure in which the outer surface of a core particle containing a melamine compound is covered by a shell portion containing an inorganic material in this manner, it is possible to produce an electrochemical device in which a high level of safety is ensured and that has excellent high-temperature storage characteristics.

In the presently disclosed composite particles for an electrochemical device, the shell portion preferably further contains a shell polymer. By using composite particles having a core-shell structure in which the outer surface of a core particle containing a melamine compound is covered by a shell portion containing an inorganic material and a shell polymer, it is possible to produce an electrochemical device in which safety and high-temperature storage characteristics are sufficiently ensured.

In the presently disclosed composite particles for an electrochemical device, the shell polymer preferably includes at least one selected from the group consisting of a carboxy group, a hydroxyl group, a nitrile group, an amino group, an epoxy group, an oxazoline group, an isocyanate group, a sulfo group, an ester group, an aldehyde group, and an amide group. By using a shell polymer that includes at least one of the functional groups described above, it is possible to further improve safety and high-temperature storage characteristics of an electrochemical device while also increasing adhesiveness of a functional layer formed using the composite particles.

In the presently disclosed composite particles for an electrochemical device, the shell polymer preferably includes a carboxy group and an amide group. By using a shell polymer that includes both a carboxy group and an amide group, it is possible to even further improve safety and high-temperature storage characteristics of an electrochemical device while also further increasing adhesiveness of a functional layer formed using the composite particles.

In the presently disclosed composite particles for an electrochemical device, the core particle preferably has a volume-average particle diameter of not less than 0.01 μm and not more than 10.00 μm. When the volume-average particle diameter of core particles is within the range set forth above, safety and high-temperature storage characteristics of an electrochemical device can be further improved.

Note that the "volume-average particle diameter" referred to in the present disclosure is the particle diameter at which, in a particle size distribution (by volume) measured by laser diffraction, cumulative volume calculated from a small diameter end of the distribution reaches 50%.

In the presently disclosed composite particles for an electrochemical device, the core particle preferably has a volume-average particle diameter of not less than 0.01 μm and less than 1.00 μm. When the volume-average particle diameter of core particles is within the range set forth above, safety and high-temperature storage characteristics of an electrochemical device can be even further improved.

In the presently disclosed composite particles for an electrochemical device, the inorganic material preferably includes a carbon material. By using a carbon material as the inorganic material, it is possible to further improve safety and high-temperature storage characteristics of an electrochemical device.

Moreover, in the presently disclosed composite particles for an electrochemical device, the carbon material preferably includes carbon nanotubes. By using carbon nanotubes as the inorganic material, it is possible to further improve safety and high-temperature storage characteristics of an electrochemical device while also enhancing rate characteristics of the electrochemical device.

In the presently disclosed composite particles for an electrochemical device, it is preferable that the inorganic material includes a particulate inorganic material and that the particulate inorganic material has a volume-average particle diameter of not less than 1 nm and not more than 500 nm. By using a particulate inorganic material having a volume-average particle diameter within the range set forth above as the inorganic material, it is possible to further improve safety and high-temperature storage characteristics of an electrochemical device.

Note that when an inorganic material is referred to as "particulate" in the present disclosure, this means that the inorganic material has an aspect ratio (major axis/minor axis) of not less than 1 and not more than 10.

The "aspect ratio" of an inorganic material can be determined by observing the inorganic material under an SEM (scanning electron microscope), measuring the largest axis (major axis) and the particle diameter (minor axis) in a direction perpendicular to the largest axis for 50 arbitrarily selected particles among the inorganic material, and calculating an average value of the ratio of the major axis and the minor axis (major axis/minor axis).

In the presently disclosed composite particles for an electrochemical device, it is preferable that the inorganic material includes a fibrous inorganic material and that the fibrous inorganic material has an average minor axis of not less than 1 nm and not more than 500 nm. By using a fibrous inorganic material having an average minor axis within the range set forth above as the inorganic material, it is possible to further improve safety and high-temperature storage characteristics of an electrochemical device.

Note that when an inorganic material is referred to as "fibrous" in the present disclosure, this means that the inorganic material has an aspect ratio (major axis/minor axis) of more than 10.

The "average minor axis" of a fibrous inorganic material can be determined by observing the fibrous inorganic material under an SEM (scanning electron microscope), measuring the minor axis of 50 arbitrarily selected fibers among the fibrous inorganic material, and calculating an average value of the minor axis.

In the presently disclosed composite particles for an electrochemical device, the inorganic material preferably includes a coupling agent. By using a coupling agent as the inorganic material, it is possible to sufficiently ensure safety of an electrochemical device.

Moreover, in the presently disclosed composite particles for an electrochemical device, the coupling agent preferably includes a silane coupling agent. By using a silane coupling agent as the inorganic material, it is possible to sufficiently ensure safety of an electrochemical device and to even further improve high-temperature storage characteristics of the electrochemical device. In addition, adhesiveness of a functional layer formed using the composite particles can be increased.

Moreover, the present disclosure aims to advantageously solve the problem set forth above, and a presently disclosed binder composition for an electrochemical device functional layer comprises: any of the composite particles for an electrochemical device set forth above; a binder for a functional layer; and a solvent. Through a device member that includes a functional layer formed using a binder composition that contains any of the composite particles set forth above, a binder for a functional layer, and a solvent, it is possible to produce an electrochemical device in which a high level of safety is ensured and that has excellent high-temperature storage characteristics.

In the presently disclosed binder composition for an electrochemical device functional layer, the binder for a functional layer is preferably a polymer including at least one selected from the group consisting of a carboxy group, a hydroxyl group, a nitrile group, an amino group, an epoxy group, an oxazoline group, an isocyanate group, a sulfo group, an ester group, an aldehyde group, and an amide group. By using a polymer that includes at least any one of the functional groups described above as the binder for a functional layer, it is possible to improve adhesiveness of a functional layer formed using the binder composition.

Furthermore, the present disclosure aims to advantageously solve the problem set forth above, and a presently disclosed conductive material paste for an electrode mixed material layer comprises: any one of the presently disclosed binder compositions for an electrochemical device functional layer set forth above; and a conductive material. Through an electrode that includes an electrode mixed material layer formed using a conductive material paste that contains any one of the binder compositions set forth above and a conductive material, it is possible to produce an electrochemical device in which a high level of safety is ensured and that has excellent high-temperature storage characteristics.

Also, the present disclosure aims to advantageously solve the problem set forth above, and a presently disclosed slurry for an electrode mixed material layer comprises: the presently disclosed conductive material paste for an electrode mixed material layer set forth above; and electrode active material particles. Through an electrode that includes an electrode mixed material layer formed using a slurry that contains the conductive material paste set forth above and electrode active material particles, it is possible to produce an electrochemical device in which a high level of safety is ensured and that has excellent high-temperature storage characteristics.

In the presently disclosed slurry for an electrode mixed material layer, the electrode active material particles preferably contain nickel. By using electrode active material particles that contain nickel, it is possible to increase the capacity of an electrochemical device.

Also, the present disclosure aims to advantageously solve the problem set forth above, and a presently disclosed electrode for an electrochemical device comprises an electrode mixed material layer formed using any one of the presently disclosed slurries for an electrode mixed material layer set forth above. By using an electrode that includes an electrode mixed material layer formed from any one of the slurries for an electrode mixed material layer set forth above, it is possible to produce an electrochemical device in which a high level of safety is ensured and that has excellent high-temperature storage characteristics.

Moreover, the present disclosure aims to advantageously solve the problem set forth above, and a presently disclosed electrochemical device comprises the presently disclosed electrode for an electrochemical device set forth above. An electrochemical device that includes the electrode set forth above has a high level of safety and excellent high-temperature storage characteristics.

Furthermore, the present disclosure aims to advantageously solve the problem set forth above, and a presently disclosed method of producing composite particles for an electrochemical device is a method of producing any of the presently disclosed composite particles for an electrochemical device set forth above, comprising a step of granulating a composition for composite particles that contains a core material including the melamine compound and a shell material including the inorganic material. By granulating a composition for composite particles that contains a core material (material for forming a core particle) of a melamine compound, etc., and a shell material (material for forming a shell portion) of an inorganic material, etc., it is possible to obtain composite particles that can sufficiently ensure safety and high-temperature storage characteristics of an electrochemical device.

Also, the present disclosure aims to advantageously solve the problem set forth above, and a presently disclosed method of producing a binder composition for an electrochemical device functional layer comprises a step of mixing any of the presently disclosed composite particles for an electrochemical device set forth above, a binder for a functional layer, and a solvent. By using a binder composition that is obtained by mixing any of the composite particles set forth above, a binder for a functional layer, and a solvent, it is possible to form a functional layer that can sufficiently ensure safety and high-temperature storage characteristics of an electrochemical device.

Moreover, the present disclosure aims to advantageously solve the problem set forth above, and a presently disclosed method of producing a conductive material paste for an electrode mixed material layer comprises: a step of mixing any of the presently disclosed composite particles for an electrochemical device set forth above, a binder for a functional layer, and a solvent to obtain a binder composition for an electrochemical device functional layer; and a step of mixing the binder composition for an electrochemical device functional layer and a conductive material. By using a conductive material paste that is obtained through the steps set forth above, it is possible to form an electrode mixed material layer that can sufficiently ensure safety and high-temperature storage characteristics of an electrochemical device.

Advantageous Effect

According to the present disclosure, it is possible to provide composite particles for an electrochemical device and a binder composition for an electrochemical device functional layer that can ensure a high level of safety of an electrochemical device while also causing the electrochemical device to display excellent high-temperature storage characteristics.

Moreover, according to the present disclosure, it is possible to provide a conductive material paste for an electrode mixed material layer and a slurry for an electrode mixed material layer with which it is possible to produce an electrode that can ensure a high level of safety of an electrochemical device while also causing the electrochemical device to display excellent high-temperature storage characteristics.

Furthermore, according to the present disclosure, it is possible to provide an electrode for an electrochemical device that can ensure a high level of safety of an electrochemical device while also causing the electrochemical device to display excellent high-temperature storage characteristics.

Also, according to the present disclosure, it is possible to provide an electrochemical device that has a high level of safety and excellent high-temperature storage characteristics.

BRIEF DESCRIPTION OF THE DRAWING

In the accompanying drawing,
FIG. 1 is a cross-sectional view schematically illustrating the structure of one example of a presently disclosed composite particle for an electrochemical device.

DETAILED DESCRIPTION

The following provides a detailed description of embodiments of the present disclosure.

The presently disclosed composite particles for an electrochemical device are for use in production of an electrochemical device and may be used, for example, in production of a functional layer (electrode mixed material layer, porous membrane layer, adhesive layer, etc.) of a device member included in an electrochemical device. Moreover, the presently disclosed composite particles for an electrochemical device can be used, for example, in production of the presently disclosed binder composition for an electrochemical device functional layer.

The presently disclosed binder composition for an electrochemical device functional layer can be used, for example, in production of the presently disclosed conductive material paste for an electrode mixed material layer.

The presently disclosed conductive material paste for an electrode mixed material layer can be used in production of the presently disclosed slurry for an electrode mixed material layer.

The presently disclosed electrode for an electrochemical device can be used as an electrode of an electrochemical device such as a lithium ion secondary battery, an electric double-layer capacitor, or a lithium ion capacitor, and is an electrode that includes an electrode mixed material layer formed using the presently disclosed slurry for an electrode mixed material layer.

The presently disclosed electrochemical device includes the presently disclosed electrode for an electrochemical device.

(Composite Particles for Electrochemical Device)

One or more presently disclosed composite particles each include a core particle and a shell portion that is bonded to the core particle such as to at least partially cover an outer surface of the core particle. In the presently disclosed composite particles, the core particle is required to contain a melamine compound and the shell portion is required to contain an inorganic material.

As a result of the presently disclosed composite particles having a core-shell structure in which a core particle containing a melamine compound is covered by a shell material containing an inorganic material, the presently disclosed composite particles can be used to produce an electrochemical device having excellent safety and high-temperature storage characteristics.

Although it is not clear why the effects described above are displayed through use of the presently disclosed composite particles, the reason for this is presumed to be as follows.

Firstly, the melamine compound contained in the core particle can decompose and release incombustible gas when the inside of an electrochemical device reaches an abnormally high temperature. Consequently, even when the inside of an electrochemical device containing the presently disclosed composite particles reaches an abnormally high temperature due to short-circuiting between electrodes, incombustible gas can be released from the melamine compound, and thermal runaway can be inhibited. On the other hand, the melamine compound contained in the core particle has a tendency to cause an unintended chemical reaction upon coming into contact with electrolyte solution of the electrochemical device. In response to this issue, the outer surface of the core particle containing the melamine compound is at least partially covered by an inorganic material in the presently disclosed composite particles such that contact between the melamine compound and electrolyte solution is inhibited. This can suppress a chemical reaction that can occur between the melamine compound and electrolyte solution inside an electrochemical device and can thus sufficiently ensure high-temperature storage characteristics of the electrochemical device.

Note that the presently disclosed composite particles are preferably contained in a functional layer such as an electrode mixed material layer, porous membrane layer, or adhesive layer that is a constituent of a device member, and are particularly preferably contained in an electrode mixed material layer, though no specific limitations are made. When the composite particles containing the melamine compound are disposed in an electrode mixed material layer, the melamine compound can act in proximity to a conductive material and electrode active material particles that are thermally unstable and release oxygen, which is a combustible substance. This makes it possible to cause rapid breakdown of electrode structure and severing of electrical conduction paths, and thus can even better ensure safety of an electrochemical device.

<Core-Shell Structure>

The presently disclosed composite particles each have the core-shell structure set forth above that includes a core portion and a shell portion. In the core-shell structure of the composite particles, the shell portion containing the inorganic material may completely cover or partially cover the outer surface of the core particle containing the melamine compound.

FIG. 1 illustrates one example of the cross-sectional structure of the composite particles for a case in which the shell portion completely covers the outer surface of the core particle. A composite particle 100 illustrated in FIG. 1 has a core-shell structure including a core particle 110 and a shell portion 120. The core particle 110 is present further inward than the shell portion 120 in the composite particle 100. The shell portion 120 covers an outer surface 110S of the core particle 110 and is normally present furthest outward in the composite particle 100. In FIG. 1, the shell portion 120 completely covers the outer surface 110S of the core particle 110.

<Core Particle>

The core particle located at the core portion of each of the presently disclosed composite particles is required to contain at least a melamine compound and may contain components other than the melamine compound (i.e., other compounds). In other words, the core particle may be a particle that is composed of only the melamine compound or may be a particle that contains the melamine compound and one or more other compounds.

《Melamine Compound》

Examples of the melamine compound include melamine, derivatives of melamine, and salts of melamine and derivatives thereof. The melamine or derivative of melamine may, for example, be a compound represented by the following formula (I).

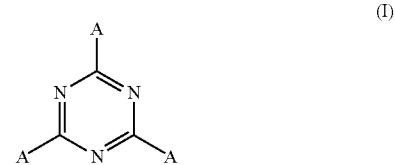

In formula (I), each A represents, independently of one another, a hydroxyl group or —NR$^1$R$^2$ (R$^1$ and R$^2$ each represent, independently of each other, a hydrogen atom, a hydrocarbon group, or a hydroxyl group-containing hydrocarbon group; when more than one R$^1$ is present in formula (I), each R$^1$ may be the same or different; and when more than one R$^2$ is present in formula (I), each R$^2$ may be the same or different).

Note that when the hydrocarbon group and the hydroxyl group-containing hydrocarbon group of R$^1$ and R$^2$ include two or more carbon atoms, these groups may have one or more oxygen atoms (—O—) interposed between carbon atoms (however, when two or more oxygen atoms are interposed, these oxygen atoms are not adjacent to one another). The number of carbon atoms in the hydrocarbon group and the hydroxyl group-containing hydrocarbon group of $R^1$ and $R^2$ is not specifically limited but is preferably not less than 1 and not more than 5.

Moreover, examples of salts of melamine and derivatives of melamine include, but are not specifically limited to, sulfates, cyanurates, and polyphosphates.

The melamine compound is preferably melamine, ammeline, ammelide, or a salt of any thereof with cyanuric acid from a viewpoint of further improving safety and high-temperature storage characteristics of an electrochemical device, and is more preferably melamine or a cyanuric acid salt of melamine (melamine cyanurate). Moreover, melamine is particularly preferable from a viewpoint of even further improving safety of an electrochemical device. In a case in which a carbon material and a coupling agent are used in combination as the subsequently described inorganic material of the shell portion, it is possible to even further improve safety of an electrochemical device by using at least one of melamine and melamine cyanurate as the melamine compound of the core portion.

Note that one melamine compound may be used individually, or two or more melamine compounds may be used in combination in a freely selected ratio.

From a viewpoint of further improving safety of an electrochemical device, the proportion constituted by the melamine compound in the core particle when the mass of the core particle (i.e., the total mass of the melamine compound and other compounds) is taken to be 100 mass % is preferably 70 mass % or more, more preferably 80 mass % or more, even more preferably 90 mass % or more, particularly preferably 95 mass % or more, and most preferably 100 mass % (i.e., the core particle is most preferably composed of only the melamine compound).

«Other Compounds»

No specific limitations are placed on other compounds that can optionally be contained in the core particle so long as the effects disclosed hereinafter are not significantly impaired. For example, the core particle may contain foaming agents other than the melamine compound (i.e., other foaming agents) that decompose at high temperature to release incombustible gas. Examples of such other foaming agents include azobisisobutyronitrile, p-toluenesulfonyl hydrazide, 5-methyl-1H-benzotriazole, oxybis(benzenesulfonyl hydrazide), trihydrazine triazine, azodicarbonamide, hydrazodicarbonamide, dinitrosopentamethylenetetramine, p-toluenesulfonyl semicarbazide, and p,p'-oxybis (benzenesulfonyl semicarbazide). Note that one other compound may be used individually, or two or more other compounds may be used in combination in a freely selected ratio.

«Volume-Average Particle Diameter»

The volume-average particle diameter of the core particle is preferably 0.01 μm or more, more preferably 0.05 μm or more, and even more preferably 0.15 μm or more, and is preferably 10.0 μm or less, more preferably 5.00 μm or less, even more preferably 2.00 μm or less, further preferably less than 1.00 μm, and particularly preferably 0.90 μm or less. High-temperature storage characteristics of an electrochemical device can be further enhanced when the volume-average particle diameter of the core particle is 0.01 μm or more, whereas safety of an electrochemical device can be even further improved when the volume-average particle diameter of the core particle is 10.00 μm or less.

«Proportion Constituted by Core Particle in Composite Particle»

The proportion constituted by the core particle among the total of the core particle and the shell portion in each of the composite particles when the total of the core particle and the shell portion is taken to be 100 mass % is preferably 15.0 mass % or more, more preferably 20.0 mass % or more, even more preferably 50.0 mass % or more, and particularly preferably 60.0 mass % or more, and is preferably 95.0 mass % or less, more preferably 90.0 mass % or less, even more preferably 85.0 mass % or less, and further preferably 80.0 mass % or less. Safety of an electrochemical device can be further increased when the proportion constituted by the core particle among the total of the core particle and the shell portion is 15.0 mass % or more, whereas high-temperature storage characteristics of an electrochemical device can be even further improved when the proportion constituted by the core particle among the total of the core particle and the shell portion is 95.0 mass % or less.

<Shell Portion>

The shell portion is physically and/or chemically bonded to the outer surface of the core particle described above such as to at least partially cover the outer surface of the core particle. The shell portion is required to contain at least an inorganic material and can optionally contain components other than the inorganic material, such as a shell polymer, for example.

«Inorganic Material»

No specific limitations are placed on the inorganic material so long as it is a material having heat resistance that does not dissolve in a solvent contained in a binder composition or the like or in an electrolyte solution of an electrochemical device. For example, a carbon material, an oxide material, a nitride material, a simple substance of metal, and/or a coupling agent can be used as the inorganic material.

Specific Examples of Inorganic Material

Examples of carbon materials that can be used include carbon black (acetylene black, Ketjenblack® (Ketjenblack is a registered trademark in Japan, other countries, or both), furnace black, etc.), carbon nanotubes (single-walled carbon nanotubes, multi-walled carbon nanotubes, etc.; multi-walled carbon nanotubes are inclusive of cup-stacked carbon nanotubes), carbon nanofiber, graphite, fullerenes, and graphene.

Examples of oxide materials that can be used include oxides of various metals and metalloids such as silica, alumina, zirconia, titania, and iron oxide, for example.

Examples of nitride materials that can be used include nitrides of various metals and metalloids such as titanium nitride, for example.

Examples of simple substances of metals that can be used include simple substances of various metals such as aluminum and copper, for example.

Examples of coupling agents that can be used include silane coupling agents, titanate coupling agents, and aluminate coupling agents.

Examples of silane coupling agents that can be used include, but are not specifically limited to, sulfur-containing silane coupling agents such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl)disulfane; epoxy group-containing silane coupling agents such as γ-glycidoxypropyltrimethoxysilane, γ-glycidoxypropylmethyldimethoxysilane, β-(3,4- epoxycyclohexyl)ethyltrimethoxysilane, and γ-glycidoxypropylmethyldiethoxysilane (3-glycidoxypropylmethyldiethoxysilane); amino group-containing silane coupling agents such as N-(β-aminoethyl)-γ-aminopropyltrimethoxysilane, 3-aminopropyltrimethoxysilane (γ-aminopropyltrimethoxysilane), γ-aminopropyltriethoxysilane, N-(2-aminoethyl)-3-aminopropyltriethoxysilane, 3-triethoxysilyl-N-(1,3-dimethylbutylidene)propylamine, and N-phenyl-3-aminopropyltrimethoxysilane; (meth)acryloxy group-containing silane coupling agents such as γ-methacryloxypropyltrimethoxysilane, γ-methacryloxypropyltris(β-methoxyethoxy)silane, γ-methacryloxypropylmethyldimethoxysilane, γ-methacryloxypropylmethyldiethoxysilane, γ-methacryloxypropyltriethoxysilane, and γ-acryloxypropyltrimethoxysilane; vinyl group-containing silane coupling agents such as vinyltrimethoxysilane, vinyltriethoxysilane, vinyltris(β-methoxyethoxy)silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatopropyltriethoxysilane; styryl group-containing silane coupling agents such as p-styryltrimethoxysilane; ureide group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; and alkyl group-containing silane coupling agents such as isobutyltrimethoxysilane and cyclohexylmethyldimethoxysilane.

Note that in the present disclosure, "(meth)acryloxy" indicates "acryloxy" and/or "methacryloxy".

Examples of titanate coupling agents that can be used include, but are not specifically limited to, isopropyl tri-isostearoyl titanate, isopropyl tris(dioctylpyrophosphate) titanate, isopropyl tri(N-aminoethyl-aminoethyl) titanate, tetraoctyl bis(ditridecylphosphite) titanate, tetra(2,2-diallyloxymethyl-1-butyl) bis(ditridecylphosphite) titanate, bis(dioctylpyrophosphate)oxyacetate titanate, bis(dioctylpyrophosphate)ethylene titanate, tetraisopropyl bis(dioctylphosphite) titanate, and titanium aminoethyl aminoethanolate.

Examples of aluminum-based coupling agents that can be used include, but are not specifically limited to, acetoalkoxy aluminum diisopropylate.

Note that one inorganic material may be used individually, or two or more inorganic materials may be used in combination in a freely selected ratio.

Of these inorganic materials, carbon materials and oxide materials are preferable from a viewpoint of further improving high-temperature storage characteristics of an electrochemical device, with carbon materials and silica being more preferable, and carbon black, carbon nanotubes, and silica being even more preferable.

Moreover, from a viewpoint of further improving safety of an electrochemical device, carbon materials are preferable, and carbon black and carbon nanotubes are more preferable. This is because carbon materials have high thermal conductivity and thus make it possible for Joule heat generated when an internal short circuit occurs in an electrochemical device to be transmitted well to the core particle and to cause rapid foaming of the melamine compound contained in the core particle.

Moreover, carbon nanotubes are preferable from a viewpoint of improving rate characteristics of an electrochemical device.

In addition, it is preferable to use a coupling agent as the inorganic material from a viewpoint of sufficiently ensuring safety of an electrochemical device. Among coupling agents, silane coupling agents and titanate coupling agents are more preferable from a viewpoint of further improving high-temperature storage characteristics of an electrochemical device while also increasing adhesiveness of a functional layer, with silane coupling agents being even more preferable, γ-glycidoxypropylmethyldimethoxysilane and 3-aminopropyltrimethoxysilane being further preferable, and γ-glycidoxypropylmethyldimethoxysilane being particularly preferable.

The effects described above can be displayed even better when a coupling agent such as described above is used in combination with a carbon material such as carbon black.

In other words, it is preferable that a carbon material and a coupling agent are used as the inorganic material from a viewpoint of even further improving safety of an electrochemical device. Moreover, from a viewpoint of even further improving high-temperature storage characteristics of an electrochemical device while also further increasing adhesiveness of a functional layer, it is more preferable to use a carbon material and either or both of a silane coupling agent and a titanate coupling agent as the inorganic material, even more preferable to use a carbon material and a silane coupling agent as the inorganic material, further preferable to use a carbon material and either or both of γ-glycidoxypropylmethyldimethoxysilane and 3-aminopropyltrimethoxysilane as the inorganic material, and particularly preferable to use a carbon material and γ-glycidoxypropylmethyldimethoxysilane as the inorganic material.

As described further below, the shell portion preferably also contains a shell polymer. In a case in which the shell portion contains a shell polymer, the effect of using a coupling agent and a carbon material in combination described above is displayed even better. In other words, the shell portion preferably contains a shell polymer, a carbon material, and a coupling agent from a viewpoint of particularly improving safety of an electrochemical device. Moreover, from a viewpoint of particularly improving high-temperature storage characteristics of an electrochemical device while also even further increasing adhesiveness of a functional layer, the shell portion more preferably contains a shell polymer, a carbon material, and either or both of a silane coupling agent and a titanate coupling agent, even more preferably contains a shell polymer, a carbon material, and a silane coupling agent, further preferably contains a shell polymer, a carbon material, and either or both of γ-glycidoxypropylmethyldimethoxysilane and 3-aminopropyltrimethoxysilane, and particularly preferably contains a shell polymer, a carbon material, and γ-glycidoxypropylmethyldimethoxysilane.

Although no specific limitations are placed on the form in which the inorganic material described above is bonded to the outer surface of the core particle, it is presumed that the inorganic material can bond to the outer surface of the core particle as described below and can join with the core particle to form a composite particle.

The inorganic material can bond to the outer surface of the core particle through binding capacity of the melamine compound contained in the core particle and/or via the subsequently described shell polymer having binding capacity, for example. Moreover, the inorganic material can also bond to the outer surface of the core particle as a result of becoming partially embedded in the core particle and physically joining therewith during granulation (composite particle formation) and/or as a result of a functional group included in the inorganic material chemically reacting with the melamine compound contained in the core particle, for example.

[Form of Inorganic Material]

The inorganic material that is a constituent of the shell portion of each of the composite particles can have any form without any specific limitations. For example, the inorganic material may have a particulate form or a fibrous form.

In a case in which the inorganic material has a particulate form, the volume-average particle diameter of the particulate inorganic material is preferably 1 nm or more, and more preferably 10 nm or more, and is preferably 500 nm or less, more preferably 100 nm or less, and even more preferably 60 nm or less. Poor dispersion due to aggregation of the particulate inorganic material can be inhibited when the volume-average particle diameter of the particulate inorganic material is 1 nm or more, whereas the outer surface of the core particle can be efficiently covered when the volume-average particle diameter of the particulate inorganic material is 500 nm or less. Consequently, safety and high-temperature storage characteristics of an electrochemical device can be further improved when the volume-average particle diameter of the particulate inorganic material is within any of the ranges set forth above.

In a case in which the inorganic material has a fibrous form, the average minor axis of the fibrous inorganic material is preferably 1 nm or more, and more preferably 10 nm or more, and is preferably 500 nm or less, more preferably 100 nm or less, and even more preferably 60 nm or less. Poor dispersion due to aggregation (entanglement) of the fibrous inorganic material can be inhibited when the average minor axis of the fibrous inorganic material is 1 nm or more, whereas the outer surface of the core particle can be efficiently covered when the average minor axis of the fibrous inorganic material is 500 nm or less. Consequently, safety and high-temperature storage characteristics of an electrochemical device can be further improved when the average minor axis of the fibrous inorganic material is within any of the ranges set forth above.

[Amount of Inorganic Material]

The amount of the inorganic material in each of the composite particles per 100 parts by mass of the core particle is preferably 1 part by mass or more, more preferably 20 parts by mass or more, even more preferably 25 parts by mass or more, and particularly preferably 30 parts by mass or more, and is preferably 500 parts by mass or less, more preferably 400 parts by mass or less, even more preferably 150 parts by mass or less, and particularly preferably 105 parts by mass or less. When the amount of the inorganic material used in formation of the composite particles is within any of the ranges set forth above, safety and high-temperature storage characteristics of an electrochemical device can be further improved.

In a case in which the inorganic material in the composite particles includes both a carbon material and a coupling agent, the proportion constituted by the coupling agent among the total of the carbon material and the coupling agent when the total amount of the carbon material and the coupling agent is taken to be 100 mass % is preferably 1 mass % or more, more preferably 3 mass % or more, even more preferably 10 mass % or more, and particularly preferably 15 mass % or more, and is preferably 50 mass % or less, more preferably 40 mass % or less, even more preferably 30 mass % or less, and particularly preferably 25 mass % or less. When the proportion constituted by the coupling agent among the total of the carbon material and the coupling agent is within any of the ranges set forth above, adhesiveness of a functional layer can be improved, and safety and high-temperature storage characteristics of an electrochemical device can be further improved.

«Shell Polymer»

The shell portion preferably contains a shell polymer in addition to the inorganic material described above. The use of a shell polymer in shell portion formation during production of composite particles makes it possible to disperse core particles well and consequently obtain composite particles in which a shell portion uniformly covers a core particle. Moreover, the binding capacity of the shell polymer can inhibit detachment of the inorganic material from the outer surface of the core particle. Consequently, such composite particles can be used to produce an electrochemical device in which safety and high-temperature storage characteristics are sufficiently ensured.

The shell polymer preferably includes a functional group. The functional group of the shell polymer may be a carboxy group, a hydroxyl group, a nitrile group, an amino group, an epoxy group, an oxazoline group, an isocyanate group, a sulfo group, an ester group, an aldehyde group, or an amide group (hereinafter, these functional groups are also referred to collectively as "prescribed functional groups"). The shell polymer may include one of the types of prescribed functional groups described above or may include two or more of the types of prescribed functional groups described above.

A shell polymer that includes any of these prescribed functional groups has excellent binding capacity and good affinity with the core particle containing the melamine compound. Consequently, the shell polymer can bond to the core particle and cover the outer surface of the core particle well while also adhering well to the inorganic material so as to sufficiently inhibit detachment of the inorganic material from the outer surface of the core particle. Therefore, safety and high-temperature storage characteristics of an electrochemical device can be further improved by using a polymer that includes any of the prescribed functional groups described above. In addition, adhesiveness of a functional layer that is obtained using the composite particles can be increased. From a viewpoint of even further improving adhesiveness of a functional layer and also safety and high-temperature storage characteristics of an electrochemical device, the shell polymer preferably includes at least one selected from the group consisting of a carboxy group, a hydroxyl group, a nitrile group, an amino group, a sulfo group, an aldehyde group, and an amide group as a prescribed functional group, more preferably includes either or both of a carboxy group and an amide group as a prescribed functional group, and particularly preferably includes both a carboxy group and an amide group as a prescribed functional group.

No specific limitations are placed on the method by which any of the prescribed functional groups described above is introduced into the shell polymer. For example, although a polymer may be produced using a monomer that includes any of the prescribed functional groups described above (prescribed functional group-containing monomer) so as to obtain a polymer that includes a prescribed functional group-containing monomer unit or any polymer may be modified so as to obtain a polymer into which any of the prescribed functional groups described above has been introduced, the former of these methods is preferable. In other words, the shell polymer preferably includes at least any one of a carboxy group-containing monomer unit, a hydroxyl group-containing monomer unit, a nitrile group-containing monomer unit, an amino group-containing monomer unit, an epoxy group-containing monomer unit, an oxazoline group-containing monomer unit, an isocyanate group-containing monomer unit, a sulfo group-containing monomer unit, an ester group-containing monomer unit, an aldehyde group-containing monomer unit, and an amide group-containing monomer unit, more preferably includes at least any one of a carboxy group-containing monomer unit, a hydroxyl group-containing monomer unit, a nitrile group-containing monomer unit, an amino group-containing monomer unit, a sulfo group-containing monomer unit, an aldehyde group-containing monomer unit, and an amide group-containing monomer unit, even more preferably includes either or both of a carboxy group-containing monomer unit and an amide group-containing monomer unit, and particularly preferably includes both a carboxy group-containing monomer unit and an amide group-containing monomer unit.

The phrase "includes a monomer unit" as used in relation to a polymer in the present disclosure means that "a polymer obtained with the monomer includes a repeating unit derived from the monomer".

[Carboxy Group-Containing Monomer Unit]

Examples of carboxy group-containing monomers that can form a carboxy group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

An acid anhydride that produces a carboxy group through hydrolysis can also be used as a carboxy group-containing monomer. Of these examples, acrylic acid and methacrylic acid are preferable as carboxy group-containing monomers. Note that one carboxy group-containing monomer may be used individually, or two or more carboxy group-containing monomers may be used in combination in a freely selected ratio.

[Hydroxyl Group-Containing Monomer Unit]

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a-COO-(C_qH_{2q}O)_p-H$ (where p represents an integer of 2 to 9, q represents an integer of 2 to 4, and $R^a$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide. Note that one hydroxyl group-containing monomer may be used individually, or two or more hydroxyl group-containing monomers may be used in combination in a freely selected ratio.

In the present disclosure, "(meth)acryl" indicates "acryl" and/or "methacryl", "(meth)allyl" indicates "allyl" and/or "methallyl", and "(meth)acryloyl" indicates "acryloyl" and/or "methacryloyl".

[Nitrile Group-Containing Monomer Unit]

Examples of nitrile group-containing monomers that can form a nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one nitrile group-containing monomer may be used individually, or two or more nitrile group-containing monomers may be used in combination in a freely selected ratio.

[Amino Group-Containing Monomer Unit]

Examples of amino group-containing monomers that can form an amino group-containing monomer unit include dimethylaminoethyl (meth)acrylate, diethylaminoethyl (meth)acrylate, aminoethyl vinyl ether, and dimethylaminoethyl vinyl ether. Note that one amino group-containing monomer may be used individually, or two or more amino group-containing monomers may be used in combination in a freely selected ratio.

In the present disclosure, "(meth)acrylate" indicates "acrylate" and/or "methacrylate".

[Epoxy Group-Containing Monomer Unit]

Examples of epoxy group-containing monomers that can form an epoxy group-containing monomer unit include monomers that include a carbon-carbon double bond and an epoxy group.

Examples of monomers that include a carbon-carbon double bond and an epoxy group include unsaturated glycidyl ethers such as vinyl glycidyl ether, allyl glycidyl ether, butenyl glycidyl ether, and o-allylphenyl glycidyl ether;

monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid. Note that one epoxy group-containing monomer may be used individually, or two or more epoxy group-containing monomers may be used in combination in a freely selected ratio.

[Oxazoline Group-Containing Monomer Unit]

Examples of oxazoline group-containing monomers that can form an oxazoline group-containing monomer unit include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. Note that one oxazoline group-containing monomer may be used individually, or two or more oxazoline group-containing monomers may be used in combination in a freely selected ratio.

[Isocyanate Group-Containing Monomer Unit]

Examples of isocyanate group-containing monomers that can form an isocyanate group-containing monomer unit include 2-acryloyloxyethyl isocyanate and 2-methacryloyloxyethyl isocyanate. Note that one isocyanate group-containing monomer may be used individually, or two or more isocyanate group-containing monomers may be used in combination in a freely selected ratio.

[Sulfo Group-Containing Monomer Unit]

Examples of sulfo group-containing monomers that can form a sulfo group-containing monomer unit include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid. Note that one sulfo group-containing monomer may be used individually, or two or more sulfo group-containing monomers may be used in combination in a freely selected ratio.

[Ester Group-Containing Monomer Unit]

Examples of ester group-containing monomers that can form an ester group-containing monomer unit include (meth)acrylic acid ester monomers. Examples of (meth)acrylic acid ester monomers include acrylic acid alkyl esters such as methyl acrylate, ethyl acrylate, n-propyl acrylate, isopropyl acrylate, butyl acrylate (n-butyl acrylate, t-butyl acrylate, etc.), pentyl acrylate, hexyl acrylate, heptyl acrylate, octyl acrylate (2-ethylhexyl acrylate, etc.), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, butyl methacrylate (n-butyl methacrylate, t-butyl methacrylate, etc.), pentyl methacrylate, hexyl methacrylate, heptyl methacrylate, octyl methacrylate (2-ethylhexyl methacrylate, etc.), nonyl methacrylate, decyl methacrylate, lauryl methacrylate, n-tetradecyl methacrylate, and stearyl methacrylate. Note that one ester group-containing monomer may be used individually, or two or more ester group-containing monomers may be used in combination in a freely selected ratio.

Also note that in a case in which a certain monomer includes a prescribed functional group other than an ester group, that monomer is considered to not be included among ester group-containing monomers in the present disclosure.

[Aldehyde Group-Containing Monomer Unit]

Examples of aldehyde group-containing monomers that can form an aldehyde group-containing monomer unit include acrolein. Note that one aldehyde group-containing monomer may be used individually, or two or more aldehyde group-containing monomers may be used in combination in a freely selected ratio.

[Amide Group-Containing Monomer Unit]

Examples of amide group-containing monomers that can form an amide group-containing monomer unit include acrylamide, methacrylamide, and vinylpyrrolidone. Note that one amide group-containing monomer may be used individually, or two or more amide group-containing monomers may be used in combination in a freely selected ratio.

When the amount of all repeating units included in the shell polymer is taken to be 100 mass %, the proportional content of prescribed functional group-containing monomer units in the shell polymer is preferably 20 mass % or more, more preferably 30 mass % or more, even more preferably 50 mass % or more, and particularly preferably 70 mass % or more from a viewpoint of further improving high-temperature storage characteristics of an electrochemical device. The upper limit for the proportional content of prescribed functional group-containing monomer units in the shell polymer is not specifically limited and can be set as 100 mass % or less, or can be set as 99 mass % or less.

Note that the proportional content of each type of monomer unit (repeating unit) in a polymer referred to in the present disclosure can be measured using a nuclear magnetic resonance (NMR) method such as $^1$H-NMR.

[Other Repeating Units]

The shell polymer may include repeating units other than the prescribed functional group-containing monomer units described above (i.e., other repeating units). Examples of such other repeating units include, but are not specifically limited to, an aromatic vinyl monomer unit such as a styrene unit, an aliphatic conjugated diene monomer unit such as a 1,3-butadiene unit, and a hydrogenated aliphatic conjugated diene monomer unit obtained through hydrogenation of an aliphatic conjugated diene monomer unit.

Note that the shell polymer may include one type of other repeating unit or may include two or more types of other repeating units.

[Production Method of Shell Polymer]

No specific limitations are placed on the method by which the shell polymer is produced. For example, the shell polymer may be produced by polymerizing a monomer composition containing one monomer or two or more monomers in an aqueous solvent and then optionally performing hydrogenation and/or modification. Note that the proportional content of each monomer in the monomer composition can be set in accordance with the desired proportional content of a monomer unit (repeating unit) in the polymer.

The polymerization method is not specifically limited and may, for example, be any of solution polymerization, suspension polymerization, bulk polymerization, and emulsion polymerization. Moreover, reactions such as ionic polymerization, radical polymerization, living radical polymerization, various types of condensation polymerization, and addition polymerization can be adopted as the polymerization reaction. Known emulsifiers and polymerization initiators can be used in the polymerization as necessary. Moreover, known methods can be used to perform hydrogenation and modification.

[Type of Shell Polymer]

From a viewpoint of further improving high-temperature storage characteristics of an electrochemical device, the shell polymer is, for example, preferably polyacrylonitrile (polymer comprising more than 50 mass % of acrylonitrile units), polyvinylpyrrolidone (polymer comprising more than 50 mass % of vinylpyrrolidone units), or an acrylic acid-acrylamide copolymer (polymer comprising more than 50 mass %, in total, of acrylic acid units and acrylamide units), and is more preferably an acrylic acid-acrylamide copolymer.

[Amount of Shell Polymer]

In a case in which each of the composite particles contains a shell polymer in the shell portion, the amount of the shell polymer in the composite particle per 100 parts by mass of the core particle is preferably 0.2 parts by mass or more, more preferably 4 parts by mass or more, even more preferably 8 parts by mass or more, and particularly preferably 10 parts by mass or more, and is preferably 100 parts by mass or less, more preferably 80 parts by mass or less, and even more preferably 20 parts by mass or less. When the amount of the shell polymer used in formation of the composite particles is within any of the ranges set forth above, safety and high-temperature storage characteristics of an electrochemical device can be further improved.

Moreover, in a case in which each of the composite particles contains a shell polymer in the shell portion, the proportion constituted by the shell polymer among the total of the inorganic material and the shell polymer when the total amount of the inorganic material and the shell polymer is taken to be 100 mass % is preferably 1 mass % or more, more preferably 5 mass % or more, and even more preferably 10 mass % or more, and is preferably 95 mass % or less, more preferably 50 mass % or less, and even more preferably 30 mass % or less. When the proportion constituted by the shell polymer among the total of the inorganic material and the shell polymer is within any of the ranges set forth above, safety and high-temperature storage characteristics of an electrochemical device can be further improved.

Note that although the shell portion of each of the composite particles may contain components other than the inorganic material and the shell polymer described above, the proportion constituted by the total amount of the inorganic material and the shell polymer in the entire shell portion when the mass of the entire shell portion is taken to be 100 mass % is preferably 90 mass % or more, more preferably 95 mass % or more, even more preferably 99 mass % or more, particularly preferably 99.9 mass % or more, and most preferably 100 mass % (i.e., the shell portion is most preferably composed of only the inorganic material or of only the inorganic material and the shell polymer).

<Properties of Composite Particles>

The water content of the composite particles is preferably 3.0 mass % or less, more preferably 1.0 mass % or less, even more preferably 0.5 mass % or less, and particularly preferably 0.1 mass % or less.

Note that the water content of the composite particles can be measured by the Karl Fischer method.

The volume-average particle diameter of the composite particles is preferably 0.01 μm or more, and more preferably 0.10 μm or more, and is preferably 5.00 μm or less, and more preferably 2.50 μm or less.

Although the shell portion containing the inorganic material may completely cover the outer surface of the core particle or partially cover the outer surface of the core particle in each of the composite particles as previously described, the proportion in which the inorganic material is present at the outer surface of the composite particle (i.e., the proportion of area of locations where the inorganic material is present at the outer surface of the composite particle relative to the area of the entire outer surface of the composite particle; also referred to as the "ratio of coverage") can be set as not less than 10% and not more than 100%, can be set as not less than 20% and not more than 100%, can be set as not less than 40% and not more than 100%, can be set as not less than 50% and not more than 100%, can be set as not less than 60% and not more than 100%, or can be set as not less than 80% and not more than 100%, for example, when the area of the entire outer surface of the composite particle is taken to be 100%, from a viewpoint of sufficiently ensuring safety and high-temperature storage characteristics of an electrochemical device.

Note that the "ratio of coverage" of the composite particles referred to in the present disclosure can be determined by the following method.

First, composite particles that are a collection of particles are observed under a scanning electron microscope (SEM), and then binarization is performed with respect to an obtained SEM image. For the outer surfaces of 10 particles that are arbitrarily selected, the area of locations where an inorganic material is present (covered area) and the area of locations where the inorganic material is not present (uncovered area) are determined from the SEM image that has been binarized. A value of "covered area/(covered area+uncovered area)×100(%)" is then calculated for each of the 10 particles, and a value that is obtained as an average value thereof can be taken to be the ratio of coverage (%).

(Production Method of Composite Particles for Electrochemical Device)

The presently disclosed composite particles set forth above can be produced using the presently disclosed method of producing composite particles, for example. The presently disclosed method of producing composite particles includes a step of granulating a composition for composite particles that contains a core material including a melamine compound and a shell material including an inorganic material. By granulating a composition for composite particles that contains a core material and a shell material, it is possible to obtain composite particles that can sufficiently ensure safety and high-temperature storage characteristics of an electrochemical device.

<Composition for Composite Particles>

The composition for composite particles contains a core material for forming a core particle of a composite particle and a shell material for forming a shell portion of a composite particle, and optionally contains a dispersion medium. In other words, the composition for composite particles is required to contain a melamine compound and an inorganic material, and optionally contains materials other than the melamine compound and the inorganic material (for example, another foaming agent that can be used to form a core particle and a shell polymer that can be used to form a shell portion) and a dispersion medium.

The core material and the shell material in the composition for composite particles are respectively for forming a core particle and a shell portion of a composite particle as previously described. Therefore, preferred examples and amounts (content ratio of components) of the core material (melamine compound, other foaming agents, etc.) and the shell material (inorganic material, shell polymer, etc.) in the composition for composite particles can be the same as the preferred examples and amounts of a core particle and a shell portion in the desired composite particles.

A dispersion medium can be used as appropriate depending on the subsequently described method of granulation, and the type of dispersion medium may be selected from water and known organic solvents as appropriate depending on the granulation method.

<Granulation>

No specific limitations are placed on the method of granulation by which the composite particles are obtained from the composition for composite particles described above so long as the specific core-shell structure can be formed. Examples of methods that may be used include fluidized granulation, spray granulation, coagulant precipitation, pH precipitation, dry mixing, and drying and granulation performed after wet mixing. Of these methods, spray granulation and dry mixing are preferable.

«Spray Granulation»

In spray granulation, a composition for composite particles (slurry composition for composite particles) that contains a core material including the melamine compound, a shell material including the inorganic material, and a dispersion medium (for example, an aqueous medium such as water) can be spray dried to obtain fine particles having the specific core-shell structure.

The method by which the slurry composition for composite particles is produced is not specifically limited and can be by performing mixing of the above-described components using a known mixer. Examples of known mixers that may be used include a ball mill, a sand mill, a bead mill, a pigment disperser, a grinding machine, an ultrasonic disperser, a homogenizer, and a planetary mixer. The mixing is normally performed in a range of from room temperature to 80° C. for from 10 minutes to several hours. The solid content concentration of the slurry composition for composite particles that is obtained by the mixing described above is not specifically limited but is preferably 1 mass % or more, more preferably 5 mass % or more, and particularly preferably 10 mass % or more, and is preferably 50 mass % or less, more preferably 40 mass % or less, and particularly preferably 30 mass % or less.

Note that in a case in which a shell polymer is used as the shell material, it is preferable that the melamine compound used as the core material, the shell polymer used as the shell material, and the dispersion medium are premixed, and that the resultant premix is then mixed with the inorganic material used as the shell material. By performing mixing in this order, the shell polymer can bind to the surfaces of particles formed of the melamine compound and can cause good dispersion of the melamine compound in the dispersion medium. This makes it possible to obtain composite particles in which a shell portion containing the inorganic material and the shell polymer uniformly covers a core particle containing the melamine compound.

The slurry composition for composite particles obtained through mixing as described above is sprayed using a spray dryer so as to dry droplets of the sprayed slurry composition for composite particles inside a drying column. This causes the shell material to physically and/or chemically bond to the outer surface of the core material contained in the droplets, thus making it possible to obtain composite particles in which the outer surface of a core particle is at least partially covered by a shell portion. The temperature of the slurry composition for composite particles that is sprayed is normally room temperature, but may be set as a higher temperature than room temperature through heating of the slurry composition for composite particles. Moreover, the hot air temperature during spray drying is normally 80° C. to 250° C., and preferably 100° C. to 200° C.

«Dry Mixing»

In dry mixing, a composition for composite particles that contains a core material including the melamine compound and a shell material including the inorganic material can be mixed with a solid content concentration of 99 mass % or more to obtain fine particles having the specific core-shell structure.

The method of dry mixing of the core material and the shell material may be a vessel stirring method using a rocking mixer, a tumbler mixer, or the like in which contents are mixed through shaking and/or rotation of a vessel itself; a mechanical stirring method using a horizontal cylinder mixer, a V-type mixer, a ribbon mixer, a conical screw mixer, a high speed fluid mixer, a rotating disk mixer, a high speed rotating blade mixer, or the like that is a mixer in which a blade, rotating disk, screw, or the like for stirring is attached inside a vessel to a horizontal or vertical rotating axle; an airflow stirring method in which a powder is mixed in a fluidized bed using swirling airflow by compressed gas; or the like. Moreover, a mixer in which any of these mechanisms are used individually or in combination can be used. Furthermore, after dry mixing has been performed, pulverization may be performed to an extent that breaks up aggregation using a mortar or the like.

(Binder Composition for Electrochemical Device Functional Layer)

The presently disclosed binder composition is a composition that contains the presently disclosed composite particles set forth above, a binder for a functional layer, and a solvent. The presently disclosed binder composition can optionally further contain components other than the composite particles, the binder for a functional layer, and the solvent (i.e., other components). Through a device member that includes a functional layer formed using the presently disclosed binder composition, it is possible to produce an electrochemical device that has a high level of safety while also having excellent high-temperature storage characteristics.

Note that in the presently disclosed binder composition for an electrochemical device functional layer and also in the presently disclosed conductive material paste for an electrode mixed material layer and presently disclosed slurry for an electrode mixed material layer that are described further below (hereinafter, also referred to collectively as the "binder composition or the like"), the composite particles maintain a core-shell structure in which the outer surface of a core particle is at least partially covered by a shell portion. However, some of the inorganic material and/or shell polymer that was contained in the shell portion may detach from the core particle in the presently disclosed binder composition or the like and thus be present separately from the composite particle in a dispersed and/or dissolved state in the solvent.

<Solvent>

The solvent of the binder composition may be water or an organic solvent. Examples of organic solvents that can be used include acetonitrile, N-methylpyrrolidone, acetylpyridine, cyclopentanone, N,N-dimethylacetamide, dimethylformamide, dimethyl sulfoxide, methylformamide, methyl ethyl ketone, furfural, and ethylenediamine. Of these solvents, N-methylpyrrolidone (NMP) is most preferable as an organic solvent from a viewpoint of ease of handling, safety, and ease of synthesis.

Note that one solvent may be used individually, or two or more solvents may be used as a mixture.

<Binder for Functional Layer>

By using a binder composition that contains a binder for a functional layer, it is possible to form a functional layer that has excellent adhesiveness. Note that in the present disclosure, the binder for a functional layer is considered to not be inclusive of a melamine compound.

From a viewpoint of further improving adhesiveness of a functional layer, the binder for a functional layer is preferably a polymer that includes at least one selected from the group consisting of a carboxy group, a hydroxyl group, a nitrile group, an amino group, an epoxy group, an oxazoline group, an isocyanate group, a sulfo group, an ester group, an aldehyde group, and an amide group (i.e., the "prescribed functional groups" previously described in the "Shell polymer" section). The polymer forming the binder for a functional layer may include one of these types of prescribed functional groups or may include two or more of these types of prescribed functional groups. Moreover, from a viewpoint of even further improving adhesiveness of a functional layer, the binder for a functional layer preferably includes at least one selected from the group consisting of a carboxy group, a hydroxyl group, an amino group, and a nitrile group as a prescribed functional group, and more preferably includes either or both of a carboxy group and a nitrile group as a prescribed functional group.

No specific limitations are placed on the method by which any of the prescribed functional groups described above is introduced into the binder for a functional layer. For example, although a polymer may be produced using a prescribed functional group-containing monomer so as to obtain a polymer that includes a prescribed functional group-containing monomer unit or any polymer may be modified so as to obtain a polymer into which any of the prescribed functional groups described above has been introduced, the former of these methods is preferable. In other words, the binder for a functional layer preferably includes at least any one of a carboxy group-containing monomer unit, a hydroxyl group-containing monomer unit, a nitrile group-containing monomer unit, an amino group-containing monomer unit, an epoxy group-containing monomer unit, an oxazoline group-containing monomer unit, an isocyanate group-containing monomer unit, a sulfo group-containing monomer unit, an ester group-containing monomer unit, an aldehyde group-containing monomer unit, and an amide group-containing monomer unit, more preferably includes at least any one of a carboxy group-containing monomer unit, a hydroxyl group-containing monomer unit, an amino group-containing monomer unit, and a nitrile group-containing monomer unit, and even more preferably includes either or both of a carboxy group-containing monomer unit and a nitrile group-containing monomer unit.

Examples of carboxy group-containing monomers that can form a carboxy group-containing monomer unit, hydroxyl group-containing monomers that can form a hydroxyl group-containing monomer unit, nitrile group-containing monomers that can form a nitrile group-containing monomer unit, amino group-containing monomers that can form an amino group-containing monomer unit, epoxy group-containing monomers that can form an epoxy group-containing monomer unit, oxazoline group-containing monomers that can form an oxazoline group-containing monomer unit, isocyanate group-containing monomers that can form an isocyanate group-containing monomer unit, sulfo group-containing monomers that can form a sulfo group-containing monomer unit, ester group-containing monomers that can form an ester group-containing monomer unit, aldehyde group-containing monomers that can form an aldehyde group-containing monomer unit, and amide group-containing monomers that can form an amide group-containing monomer unit include the same monomers as previously described in the "Composite particles for electrochemical device" section. Note that one of these monomers may be used individually, or two or more of these monomers may be used in combination in a freely selected ratio.

«Production Method of Binder for Functional Layer»

No specific limitations are placed on the method by which the binder for a functional layer is produced. For example, the binder for a functional layer may be produced by polymerizing a monomer composition containing one monomer or two or more monomers in an aqueous solvent and then optionally performing hydrogenation and/or modification. Note that the proportional content of each monomer in the monomer composition can be set in accordance with the desired proportional content of a monomer unit (repeating unit) in the polymer.

The polymerization method is not specifically limited and may, for example, be any of solution polymerization, suspension polymerization, bulk polymerization, and emulsion polymerization. Moreover, reactions such as ionic polymerization, radical polymerization, living radical polymerization, various types of condensation polymerization, and addition polymerization can be adopted as the polymerization reaction. Known emulsifiers and polymerization initiators can be used in the polymerization as necessary. Moreover, known methods can be used to perform hydrogenation and modification.

«Type of Binder for Functional Layer»

Polyacrylonitrile, polybutyl acetal (polyvinyl formal, polyvinyl butyral, etc.), polyvinylpyrrolidone, or the like, for example, can preferably be used as the binder for a functional layer from a viewpoint of further improving adhesiveness of a functional layer, with polyvinylpyrrolidone and polyacrylonitrile being more preferable, and polyacrylonitrile even more preferable.

Note that a known binder that does not include any of the prescribed functional groups described above (polyvinylidene fluoride, etc.) can be used as the binder for a functional layer.

«Amount of Binder for Functional Layer»

The presently disclosed binder composition preferably contains 1 part by mass or more, more preferably 10 parts by mass or more, and even more preferably 50 parts by mass or more of a binder for a functional layer (particularly a binder for a functional layer including any of the prescribed functional groups described above) per 100 parts by mass of the previously described composite particles, and preferably contains 500 parts by mass or less, more preferably 400 parts by mass or less, and even more preferably 250 parts by mass or less of the binder for a functional layer per 100 parts by mass of the composite particles. Adhesiveness of a functional layer can be further improved while also even further improving high-temperature storage characteristics of an electrochemical device by using 1 part by mass or more of the binder for a functional layer per 100 parts by mass of the composite particles in production of the binder composition, whereas an electrochemical device in which good safety is sufficiently ensured can be obtained by using 500 parts by mass or less of the binder for a functional layer per 100 parts by mass of the composite particles in production of the binder composition.

<Other Components>

Besides the components described above, the presently disclosed binder composition may contain known components such as cross-linkers, reinforcing materials, antioxidants, dispersants, rheology modifiers, and additives for electrolyte solution having a function of inhibiting decomposition of electrolyte solution. The binder composition may contain one other component or may contain two or more other components in freely selected proportions.

(Production Method of Binder Composition for Electrochemical Device Functional Layer)

The presently disclosed binder composition set forth above can be produced by the presently disclosed method of producing a binder composition, for example. The presently disclosed method of producing a binder composition includes a step of mixing the composite particles, the binder for a functional layer, the solvent, and other components that are used as necessary. Through the step described above, it is possible to obtain a binder composition that can sufficiently ensure safety and high-temperature storage characteristics of an electrochemical device.

More specifically, the binder composition can be produced by dissolving and/or dispersing the composite particles, the binder for a functional layer, and other components that are used as necessary in the solvent. In production of the binder composition, the binder for a functional layer is preferably mixed with the composite particles while in a dissolved state in the solvent. The mixing method used to obtain the binder composition is not specifically limited and can be a method using a typical mixing device such as a disper blade, a mill, or a kneader.

Moreover, production of the binder composition may be performed at the same time as production of the conductive material paste for an electrode mixed material layer described below.

The solid content concentration of the binder composition is preferably 3 mass % or more, more preferably 5 mass % or more, and even more preferably 10 mass % or more, and is preferably 50 mass % or less, and more preferably 40 mass % or less.

(Conductive Material Paste for Electrode Mixed Material Layer)

The presently disclosed conductive material paste is a composition that contains the presently disclosed binder composition set forth above and a conductive material. In other words, the presently disclosed conductive material paste contains the previously described composite particles, the previously described binder for a functional layer, the previously described solvent, and a conductive material, and can optionally contain the previously described other components. Note that the presently disclosed conductive material paste does not normally contain electrode active material particles.

Through an electrode that includes an electrode mixed material layer formed using the presently disclosed conductive material paste, it is possible to produce an electrochemical device that has a high level of safety while also having excellent high-temperature storage characteristics.

<Conductive Material>

The conductive material is a component that, in an electrochemical device, increases the electrical conductivity of an electrode mixed material layer included in an electrode for an electrochemical device. Examples of conductive materials that can be used include, but are not specifically limited to, conductive carbon materials and fibers, foils, and particles of various metals. Examples of conductive carbon materials include carbon black (for example, acetylene black, Ketjenblack®, and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber.

Note that one conductive material may be used individually, or two or more conductive materials may be used in combination in a freely selected ratio.

The specific surface area of the conductive material is preferably 30 $m^2/g$ or more, and more preferably 40 $m^2/g$ or more, and is preferably 2,000 $m^2/g$ or less, more preferably 1,500 $m^2/g$ or less, even more preferably 1,000 $m^2/g$ or less, and particularly preferably 500 $m^2/g$ or less. Through the specific surface area of the conductive material being 30 $m^2/g$ or more, an electrode mixed material layer having excellent electrical conductivity can be formed even when the content of the conductive material is small. On the other hand, dispersibility of the conductive material can be increased through the specific surface area of the conductive material being 2,000 $m^2/g$ or less.

The specific surface area of the conductive material referred to in the present disclosure is the nitrogen adsorption specific surface area measured by the BET method and can be measured in accordance with ASTM D3037-81.

Although no specific limitations are placed on the quantitative ratio of the conductive material and the composite particles in the presently disclosed conductive material paste, the amount of the composite particles in the conductive material paste is preferably 10 parts by mass or more per 100 parts by mass of the conductive material, and is preferably 3,000 parts by mass or less, and more preferably 350 parts by mass or less per 100 parts by mass of the conductive material. The safety of an electrochemical device can be further improved when 10 parts by mass or more of the composite particles are used per 100 parts by mass of the conductive material in production of the conductive material paste, whereas internal resistance does not excessively increase and rate characteristics of an electrochemical device can be ensured when 3,000 parts by mass or less of the composite particles are used per 100 parts by mass of the conductive material in production of the conductive material paste.

Moreover, although no specific limitations are placed on the quantitative ratio of the conductive material and the binder for a functional layer in the presently disclosed conductive material paste, the amount of the binder for a functional layer in the conductive material paste is preferably 1 part by mass or more, and more preferably 5 parts by mass or more per 100 parts by mass of the conductive material, and is preferably 200 parts by mass or less, more preferably 100 parts by mass or less, and even more preferably 60 parts by mass or less per 100 parts by mass of the conductive material. Adhesiveness of an electrode mixed material layer can be further improved when 1 part by mass or more of the binder for a functional layer is used per 100 parts by mass of the conductive material in production of the conductive material paste, whereas internal resistance does not excessively increase and rate characteristics of an electrochemical device can be ensured when 200 parts by mass or less of the binder for a functional layer is used per 100 parts by mass of the conductive material in production of the conductive material paste.

The solid content concentration of the conductive material paste is preferably 3 mass % or more, more preferably 5 mass % or more, and even more preferably 10 mass % or more, and is preferably 50 mass % or less, more preferably 40 mass % or less, and even more preferably 30 mass % or less.

(Production Method of Conductive Material Paste for Electrode Mixed Material Layer)

The presently disclosed conductive material paste set forth above can be produced by the presently disclosed method of producing a conductive material paste, for example. The presently disclosed method of producing a conductive material paste includes: a step of mixing the composite particles, the binder for a functional layer, and the solvent to obtain a binder composition; and a step of mixing the obtained binder composition and the conductive material. Through these steps, it is possible to obtain a conductive material paste that can sufficiently ensure safety and high-temperature storage characteristics of an electrochemical device.

Note that the step of obtaining a binder composition can be implemented in the same way as the "method of producing a binder composition for an electrochemical device functional layer".

The method used to mix the binder composition and the conductive material is not specifically limited and may be a method using a typical mixing device such as a disper blade, a mill, or a kneader.

Other components that are optionally used may be added in the step of obtaining a binder composition or may be added in the step of mixing the binder composition and the conductive material.

(Slurry for Electrode Mixed Material Layer)

The presently disclosed slurry for an electrode mixed material layer is a composition that contains the conductive material paste set forth above and electrode active material particles. In other words, the presently disclosed slurry for an electrode mixed material layer contains electrode active material particles, the previously described composite particles, the previously described binder for a functional layer, the previously described solvent, and the previously described conductive material, and can optionally contain the previously described other components.

Through an electrode that includes an electrode mixed material layer formed using the presently disclosed slurry for an electrode mixed material layer, it is possible to produce an electrochemical device that has a high level of safety while also having excellent high-temperature storage characteristics.

<Electrode Active Material Particles>

The electrode active material particles are particles formed of a material (electrode active material) that gives and receives electrons in an electrode of an electrochemical device. In a case in which the electrochemical device is a lithium ion secondary battery, for example, the electrode active material is normally a material that can occlude and release lithium.

Although the following describes, as one example, a case in which the slurry for an electrode mixed material layer is a slurry for an electrode mixed material layer of a lithium ion secondary battery electrode, the presently disclosed slurry for an electrode mixed material layer is not limited to the following example.

«Positive Electrode Active Material Particles»

Although any known positive electrode active material may be used without any specific limitations as a positive electrode active material forming positive electrode active material particles, a positive electrode active material (electrode active material) that contains nickel is preferable from a viewpoint of increasing the capacity of an electrochemical device. Examples of such nickel-containing positive electrode active materials include lithium-containing nickel oxide ($LiNiO_2$), a lithium complex oxide of Co—Ni—Mn, a lithium complex oxide of Ni—Mn—Al, a lithium complex oxide of Ni—Co—Al, and a $Li_2MnO_3$—$LiNiO_2$-based solid solution, with a lithium complex oxide of Co—Ni—Mn and a lithium complex oxide of Ni—Co—Al being preferable.

The particle diameter of the positive electrode active material particles is not specifically limited and can be the same as that of conventionally used positive electrode active material particles.

«Negative Electrode Active Material Particles»

A carbon-based negative electrode active material, a metal-based negative electrode active material, a negative electrode active material that is a combination thereof, or the like can be used without any specific limitations as a negative electrode active material forming negative electrode active material particles.

The particle diameter of the negative electrode active material particles is not specifically limited and can be the same as that of conventionally used negative electrode active material particles.

[Carbon-Based Negative Electrode Active Material]

A carbon-based negative electrode active material can be defined as an active material that contains carbon as its main framework and into which lithium can be inserted (also referred to as "doping"). Examples of carbon-based negative electrode active materials include carbonaceous materials and graphitic materials.

—Carbonaceous Material—

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

—Graphitic Material—

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher. Note that natural graphite that is at least partially coated with amorphous carbon at the surface thereof (amorphous-coated natural graphite) may also be used herein as a carbon-based negative electrode active material.

[Metal-Based Negative Electrode Active Material]

The metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

—Silicon-Based Negative Electrode Active Material—

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon.

No specific limitations are placed on the quantitative ratio of the electrode active material particles and the composite particles in the presently disclosed slurry for an electrode mixed material layer. For example, the slurry for an electrode mixed material layer preferably contains 0.1 parts by mass or more, and more preferably 0.5 parts by mass or more of the composite particles per 100 parts by mass of the electrode active material particles, and preferably contains 20 parts by mass or less, and more preferably 4 parts by mass or less of the composite particles per 100 parts by mass of the electrode active material particles. Safety of an electrochemical device can be further improved by compounding the conductive material paste in an amount such that the composite particles are 0.1 parts by mass or more per 100 parts by mass of the electrode active material particles in production of the slurry for an electrode mixed material layer, whereas device characteristics (for example, rate characteristics) of an electrochemical device can be sufficiently ensured by compounding the conductive material paste in an amount such that the composite particles are 20 parts by mass or less per 100 parts by mass of the electrode active material particles in production of the slurry for an electrode mixed material layer.

<Production Method of Slurry for Electrode Mixed Material Layer>

The presently disclosed slurry for an electrode mixed material layer can be produced by mixing the conductive material paste set forth above and the electrode active material particles. The mixing can be performed using a known mixer such as a ball mill, a sand mill, a bead mill, a pigment disperser, a grinding machine, an ultrasonic disperser, a homogenizer, a planetary mixer, or a FILMIX.

(Electrode for Electrochemical Device)

The presently disclosed electrode for an electrochemical device includes an electrode mixed material layer formed using the presently disclosed slurry for an electrode mixed material layer set forth above. For example, the presently disclosed electrode may include a current collector and an electrode mixed material layer formed on the current collector, wherein the electrode mixed material layer is a dried product of the presently disclosed slurry for an electrode mixed material layer. Note that the presently disclosed electrode for an electrochemical device may optionally include other layers besides the electrode mixed material layer (for example, an adhesive layer and/or a porous membrane layer). The presently disclosed electrode for an electrochemical device can be used as an electrode of an electrochemical device such as a lithium ion secondary battery, an electric double-layer capacitor, or a lithium ion capacitor.

By using the presently disclosed electrode, it is possible to produce an electrochemical device that has a high level of safety while also having excellent high-temperature storage characteristics.

<Current Collector>

The current collector included in the electrode for an electrochemical device is not specifically limited so long as it is a material having electrical conductivity and electrochemical durability, and may be selected in accordance with the type of electrochemical device. In a case in which the electrode for an electrochemical device is an electrode for a lithium ion secondary battery, the material forming the current collector may be iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a material forming a current collector used for a positive electrode.

Note that one of these materials may be used individually, or two or more of these materials may be used in combination in a freely selected ratio.

<Electrode Mixed Material Layer>

The electrode mixed material layer formed using the presently disclosed slurry for an electrode mixed material layer may be a dried product of the slurry for an electrode mixed material layer, for example.

Components that are contained in the electrode mixed material layer are components that were contained in the presently disclosed slurry for an electrode mixed material layer, and the preferred ratio of these components is the same as the preferred ratio of the components in the presently disclosed slurry for an electrode mixed material layer.

<Production Method of Electrode for Electrochemical Device>

No specific limitations are placed on the method by which the electrode for an electrochemical device is produced. For example, the electrode for an electrochemical device can be produced through a step of applying the slurry for an electrode mixed material layer onto at least one side of the current collector (application step) and a step of drying the slurry for an electrode mixed material layer that has been applied onto at least one side of the current collector to form an electrode mixed material layer on the current collector (drying step).

«Application Step»

The method by which the slurry for an electrode mixed material layer is applied onto the current collector is not specifically limited and may be a commonly known method. Specific examples of application methods that can be used include doctor blading, dip coating, reverse roll coating, direct roll coating, gravure coating, extrusion coating, and brush coating. The thickness of the slurry coating on the current collector after application but before drying may be set as appropriate in accordance with the thickness of the electrode mixed material layer to be obtained through drying.

«Drying Step»

The method by which the slurry for an electrode mixed material layer on the current collector is dried is not specifically limited and may be a commonly known method. Examples of drying methods that can be used include drying by warm, hot, or low-humidity air; drying in a vacuum; and drying by irradiation with infrared light, electron beams, or the like. Through drying of the slurry for an electrode mixed material layer on the current collector in this manner, an electrode mixed material layer can be formed on the current collector to thereby obtain an electrode for an electrochemical device that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector.

(Electrochemical Device)

A feature of the presently disclosed electrochemical device is that it includes the electrode for an electrochemical device set forth above. The presently disclosed electrochemical device may, for example, be a lithium ion secondary battery, an electric double-layer capacitor, or a lithium ion capacitor, but is not specifically limited thereto, and is preferably a lithium ion secondary battery. As a result of the presently disclosed electrochemical device including the presently disclosed electrode, the presently disclosed electrochemical device inhibits thermal runaway and maintains a high level of safety while also having excellent high-temperature storage characteristics.

Although the following describes, as one example, a case in which the electrochemical device is a lithium ion secondary battery, the presently disclosed electrochemical device is not limited to the following example. A lithium ion secondary battery that is an example of the presently disclosed electrochemical device normally includes electrodes (positive electrode and negative electrode), an electrolyte solution, and a separator, and has the presently disclosed electrode for an electrochemical device as at least one of the positive electrode and the negative electrode.

<Electrodes>

Examples of electrodes other than the presently disclosed electrode for an electrochemical device set forth above that can be used in the lithium ion secondary battery that is an example of the presently disclosed electrochemical device include known electrodes without any specific limitations. Specifically, an electrode obtained by forming an electrode mixed material layer on a current collector by a known production method may be used as an electrode other than the electrode for an electrochemical device set forth above.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %. Known additives such as vinylene carbonate, fluoroethylene carbonate, and ethyl methyl sulfone may be added to the electrolyte solution.

<Separator>

Examples of separators that can be used include, but are not specifically limited to, those described in JP2012-204303A. Of these separators, a microporous membrane formed of polyolefinic (polyethylene, polypropylene, polybutene, or polyvinyl chloride) resin is preferred since such a membrane can reduce the total thickness of the separator, which increases the ratio of electrode active material particles in the lithium ion secondary battery, and consequently increases the volumetric capacity. A functional layer-equipped separator that includes a functional layer (porous membrane layer or adhesive layer) at one side or both sides of a separator substrate may be used as the separator.

Formation of a functional layer of the functional layer-equipped separator can be performed using a known binder and/or non-conductive particles (for example, non-conductive inorganic particles such as alumina).

Moreover, formation of a functional layer of the functional layer-equipped separator can be performed using a binder composition that contains the presently disclosed composite particles set forth above.

<Production Method of Lithium Ion Secondary Battery>

The lithium ion secondary battery in accordance with the present disclosure can be produced by, for example, stacking the positive electrode and the negative electrode with the separator in-between, performing rolling, folding, or the like of the resultant laminate as necessary in accordance with the battery shape to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to measure or evaluate the volume-average particle diameter of core particles, the adhesiveness of a positive electrode mixed material layer, and the safety and high-temperature storage characteristics of a lithium ion secondary battery.

<Volume-Average Particle Diameter>

A laser diffraction particle size analyzer (produced by Shimadzu Corporation; product name: SALD) was used to measure the volume-average particle diameter (D50) of a melamine compound or the like used as core particles.

<Adhesiveness>

A positive electrode for a lithium ion secondary battery produced in each example or comparative example was cut out as a rectangle of 100 mm in length and 10 mm in width to obtain a test specimen. The test specimen was placed with a surface at which the positive electrode mixed material layer was present facing downward, and the surface at the positive electrode mixed material layer-side of the test specimen was affixed to a test stage (base plate made of SUS) through cellophane tape (tape in accordance with JIS Z1522). Thereafter, the stress (N/m) when the current collector was peeled off by pulling one end of the current collector in a perpendicular direction at a pulling speed of 50 mm/min was measured (note that the cellophane tape was fixed to the test stage).

Three measurements were performed in the same manner, and an average value thereof was determined as the positive electrode peel strength and was evaluated by the following standard.

A larger value for the positive electrode peel strength indicates that the positive electrode mixed material layer has better adhesiveness and has strong close adherence to the current collector.

«Evaluation Standard»

SA: Positive electrode peel strength of 50 N/m or more
A: Positive electrode peel strength of not less than 30 N/m and less than 50 N/m
B: Positive electrode peel strength of less than 30 N/m <Safety>

The safety of a lithium ion secondary battery was evaluated by an internal short circuit test described below.

A porous membrane layer-equipped separator obtained as described below (substrate: polypropylene; porous membrane layer thickness: 4 μm; having 1 cm square hole opened therein) was sandwiched between a positive electrode for a lithium ion secondary battery and a negative electrode for a lithium ion secondary battery produced in each example or comparative example (each equipped with a tab), and these members were sealed in an aluminum pouch to produce a cell. A circular tube (SUS) of 8 mm in diameter was used to apply a force of 10 N to the part where a hole was opened in the porous membrane layer-equipped separator of the cell so as to create an enforced internal short circuit part. A direct current stabilized power supply (produced by Kikusui Electronics Corporation; product name: PWR1201L) was then used to apply 20 V with respect to the positive electrode tab and the negative electrode tab of the cell, during which, the current and voltage were monitored. The resistance was calculated from the current and voltage, and the time (×100 resistance time) taken for the resistance to increase by a factor of 100 from straight after application of the voltage of 20 V was measured. An evaluation was made by the following standard. A shorter ×100 resistance time indicates that the lithium ion secondary battery has better safety.

«Evaluation Standard»

SA: ×100 resistance time of less than 1 s
A: ×100 resistance time of not less than 1 s and less than 3 s
B: ×100 resistance time of not less than 3 s and less than 8 s
C: ×100 resistance time of 8 s or more «Production of Porous Membrane Layer-Equipped Separator»

A separator made of a single layer of polypropylene (produced by Celgard, LLC.; product name: #2500) was prepared as a separator substrate.

A composition for a porous membrane layer was produced by mixing 6.0 parts in terms of solid content of an acrylic polymer as a binder, 1.5 parts in terms of solid content of an acrylamide polymer into which a carboxy group had been introduced (POLYSTRON® 117 (POLYSTRON is a registered trademark in Japan, other countries, or both) produced by Arakawa Chemical Industries, Ltd.) as a thickener, and 0.2 parts in terms of solid content of a polyethylene glycol surfactant (SAN NOPCO® SN WET 366 (SAN NOPCO is a registered trademark in Japan, other countries, or both) produced by San Nopco Limited) with 100 parts of alumina filler (LS256 produced by Nippon Light Metal Co., Ltd.) as non-conductive particles.

The composition for a porous membrane layer obtained as described above was applied onto one side of the separator substrate described above using a wire bar and was dried at 60° C. for 10 minutes. This yielded a porous membrane layer-equipped separator having a porous membrane layer thickness of 4 μm. A 1 cm square hole was opened in the obtained porous membrane layer-equipped separator.

<High-Temperature Storage Characteristics>

A lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged (upper limit cell voltage: 4.20 V) by a 0.2 C constant-current method and CC discharged to 3.00 V by a 0.2 C constant-current method. This charging and discharging at 0.2 C was repeated three times. The discharge capacity obtained in the final repetition of charging and discharging was taken to be X1.

The lithium ion secondary battery was subsequently charged to a cell voltage of 4.20 V at 25° C. and was left in that state in an environment having a temperature of 85° C. for 2 days. Thereafter, the lithium ion secondary battery was discharged to a cell voltage of 3.00 V by a 0.2 C constant-current method at 25° C. This discharge capacity was taken to be X2.

A capacity maintenance rate expressed by $\Delta C=(X2/X1)\times 100(\%)$ was determined using the discharge capacity X1 and the discharge capacity X2 and was evaluated by the following standard. A larger value for the capacity maintenance rate $\Delta C$ indicates better high-temperature storage characteristics.

«Evaluation Standard»

SA: $\Delta C$ of 83% or more
A: $\Delta C$ of not less than 80% and less than 83%
B: $\Delta C$ of not less than 77% and less than 80%
C: $\Delta C$ of less than 77%

(Preparation of Various Polymers)

<Polymer A>

A reactor A equipped with a mechanical stirrer and a condenser was charged with 85 parts of deionized water and 0.2 parts of sodium dodecylbenzenesulfonate in a nitrogen atmosphere, these materials were heated to 55° C. under stirring, and 0.3 parts of potassium persulfate was added into the reactor A in the form of a 5.0% aqueous solution. Next, a separate vessel B equipped with a mechanical stirrer was charged with 94.0 parts of acrylonitrile as a nitrile group-containing monomer, 1.0 parts of acrylamide as an amide group-containing monomer, 2.0 parts of acrylic acid as a carboxy group-containing monomer, 3.0 parts of n-butyl acrylate as an ester group-containing monomer, 0.6 parts of sodium dodecylbenzenesulfonate, 0.035 parts of t-dodecyl mercaptan, 0.4 parts of polyoxyethylene lauryl ether, and 80 parts of deionized water in a nitrogen atmosphere, and these materials were stirred and emulsified to produce a monomer mixture. The monomer mixture was added into the reactor A over 5 hours at a constant rate while in a stirred and emulsified state, and a reaction was carried out until the polymerization conversion rate reached 95% to yield a water dispersion of a polymer A (polyacrylonitrile). An appropriate amount of NMP was added to the obtained water dispersion of the polymer A so as to obtain a mixture. Thereafter, vacuum distillation was performed at 90° C. so as to remove water and excess NMP from the mixture and thereby yield an NMP solution (solid content concentration: 8%) of the polymer A.

<Polymer B>

A 1 L flask equipped with a septum was charged with 720 parts of deionized water. The deionized water was heated to a temperature of 40° C., and the inside of the flask was purged with nitrogen gas at a flow rate of 100 mL/min. Next, 10 parts of deionized water, 30 parts of acrylic acid as a carboxy group-containing monomer, and 70 parts of acrylamide as an amide group-containing monomer were mixed and were injected into the flask by a syringe. Thereafter, 8 parts of a 2.5% aqueous solution of potassium persulfate as a polymerization initiator was added into the flask by a syringe. After 15 minutes had passed, 22 parts of a 2.0% aqueous solution of tetramethylethylenediamine as a polymerization accelerator was added by a syringe. After 4 hours had passed, 4 parts of a 2.5% aqueous solution of potassium persulfate as a polymerization initiator was added into the flask, 11 parts of a 2.0% aqueous solution of tetramethylethylenediamine as a polymerization accelerator was further added, and the polymerization reaction was allowed to proceed under heating to a temperature of 60° C. After 3 hours had passed, the flask was opened to air to terminate the polymerization reaction, and the product was deodorized at a temperature of 80° C. to remove residual monomer. The product was then adjusted to pH 8 using a 10% aqueous solution of lithium hydroxide to yield a water dispersion of a polymer B (acrylic acid-acrylamide copolymer). An appropriate amount of NMP was added to the obtained water dispersion of the polymer B so as to obtain a mixture. Thereafter, vacuum distillation was performed at 90° C. so as to remove water and excess NMP from the mixture and thereby yield an NMP solution (solid content concentration: 8%) of the polymer B.

<Production of Polymer C>

An NMP solution (solid content concentration: 8%) of polyvinylpyrrolidone (produced by Wako Pure Chemical Industries, Ltd.; special grade reagent; product name: Polyvinylpyrrolidone K30; polymer C) was prepared.

Example 1

<Preparation of Core Material>

Melamine was prepared as a core material for forming core particles.

<Preparation of Shell Material>

«Inorganic Material»

Acetylene black (volume-average particle diameter: 25 nm) was prepared as an inorganic material.

«Shell Polymer»

A water dispersion of the polymer B was prepared by the same procedure as described above in "Preparation of various polymers".

<Production of Composite Particles>

After adding 200 g of melamine to 1 L of distilled water, stirred mixing thereof was performed at room temperature for 2 hours using a Three-One Motor (produced by SHINTO Scientific Co., Ltd.; product name: BL300). Separation by filtration was then performed using a wire mesh to perform washing. This operation was repeated once more.

The washed material that was obtained in this manner was then washed twice in the same way as described above but using 1 L of ethanol instead of 1 L of distilled water in order to purify the washed material.

Next, 100 parts of melamine purified as described above, 10 parts in terms of solid content of the water dispersion of the polymer B, and 1,240 parts of deionized water were weighed out, and a pre-dispersion (premix) thereof was produced using a Three-One Motor (produced by SHINTO Scientific Co., Ltd.; product name: BL300). A bead mill (produced by Ashizawa Finetech Ltd.; product name: LMZ-015) was then used to treat 1,350 g of the obtained pre-dispersion for 10 minutes under conditions of a bead diameter of 0.5 mm, a bead loading rate of 80%, and a circumferential speed of 12 m/s. The volume-average particle diameter of the melamine (core particles) in the obtained dispersion liquid was measured. The result is shown in Table 1.

Next, 50 parts of acetylene black was added to the obtained dispersion liquid, and a bead mill (produced by Ashizawa Finetech Ltd.; product name: LMZ-015) was then used to perform treatment thereof for 20 minutes under conditions of a bead diameter of 0.5 mm, a bead loading rate of 80%, and a circumferential speed of 12 m/s to yield a slurry composition.

The obtained slurry composition was supplied into a spray dryer (produced by Ohkawara Kakohki Co., Ltd.; product name: OC-16) and was spray dried using a rotating disk atomizer (diameter: 65 mm) under conditions of a rotation speed of 25,000 rpm, a hot air temperature of 150° C., and a particle collection outlet temperature of 90° C. to obtain composite particles. Upon observation of the composite particles using a scanning electron microscope, the outer surfaces of core particles formed of melamine were confirmed to be at least partially covered by a shell portion formed of the polymer B and acetylene black.

<Production of Conductive Material Paste>

In a dry room having a dew point of −40° C., 100 parts of acetylene black (BET specific surface area: 68 m$^2$/g) as a conductive material, 50 parts of the composite particles obtained as described above, 50 parts in terms of solid content of the NMP solution of the polymer A, and an appropriate amount of NMP as a solvent were stirred by a disper blade (3,000 rpm, 60 minutes) and were then mixed at a circumferential speed of 8 m/s for 1 hour using a bead mill in which zirconia beads of 0.3 mm in diameter were used so as to produce a conductive material paste. Note that the conductive material paste had a solid content concentration of 15.0 mass %. Also note that a binder composition and a conductive material paste were produced at the same time through this operation.

<Production of Slurry for Positive Electrode Mixed Material Layer>

A slurry for a positive electrode mixed material layer was obtained by mixing 100 parts of an active material NMC532 based on a lithium complex oxide of Co—Ni—Mn ($LiNi_{0.5}Mn_{0.3}Co_{0.2}O_2$) as positive electrode active material particles, 4.0 parts in terms of solid content of the conductive material paste produced as described above, and 2.0 parts in terms of solid content of polyvinylidene fluoride (PVDF) (produced by Kureha Corporation; product name: L #7208) as a known binder not including a prescribed functional group in a planetary mixer, further gradually adding NMP, and performing stirred mixing at a temperature of 25±3° C. and a rotation speed of 60 rpm such that the viscosity at 60 rpm (M4 rotor) and 25±3° C. measured by a B-type viscometer was 3,600 mPa·s.

<Production of Positive Electrode>

The slurry for a positive electrode mixed material layer obtained as described above was applied onto aluminum foil of 20 μm in thickness serving as a current collector by a comma coater such as to have a coating weight of 20±0.5 mg/cm².

The aluminum foil was conveyed inside an oven having a temperature of 90° C. for 2 minutes and an oven having a temperature of 120° C. for 2 minutes at a speed of 200 mm/min so as to dry the slurry for a positive electrode mixed material layer on the aluminum foil and thereby obtain a positive electrode web having a positive electrode mixed material layer formed on the current collector.

The positive electrode mixed material layer-side of the produced positive electrode web was subsequently roll pressed with a line pressure of 14 t (tons) in an environment having a temperature of 25±3° C. to obtain a positive electrode having a positive electrode mixed material layer density of 3.20 g/cm³. Adhesiveness of the positive electrode mixed material layer was evaluated for the obtained positive electrode. The obtained positive electrode was also used with the negative electrode described below to evaluate safety of a lithium ion secondary battery. The results are shown in Table 1.

<Production of Negative Electrode>

A 5 MPa pressure-resistant vessel equipped with a stirrer was charged with 63 parts of styrene as an aromatic vinyl monomer, 34 parts of 1,3-butadiene as an aliphatic conjugated diene monomer, 2 parts of itaconic acid as a carboxy group-containing monomer, 1 part of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. Cooling was performed to quench the reaction at the point at which monomer consumption reached 95.0%. The water dispersion containing a polymer that was obtained in this manner was adjusted to pH 8 through addition of 5% sodium hydroxide aqueous solution. Unreacted monomer was subsequently removed through thermal-vacuum distillation. Thereafter, cooling was performed to a temperature of 30° C. or lower to yield a water dispersion (binder composition for a negative electrode) containing a binder for a negative electrode.

A planetary mixer was charged with 48.75 parts of artificial graphite (theoretical capacity: 360 mAh/g) and 48.75 parts of natural graphite (theoretical capacity: 360 mAh/g) as negative electrode active material particles and with 1 part in terms of solid content of carboxymethyl cellulose as a thickener. These materials were diluted to a solid content concentration of 60% with deionized water and were then kneaded at a rotation speed of 45 rpm for 60 minutes. Thereafter, 1.5 parts in terms of solid content of the binder composition for a negative electrode obtained as described above was added and was kneaded therewith at a rotation speed of 40 rpm for 40 minutes. Deionized water was then added to adjust the viscosity to 3,000±500 mPa·s (measured at 25° C. and 60 rpm using a B-type viscometer) and thereby produce a slurry composition for a negative electrode.

The slurry composition for a negative electrode was applied onto the surface of copper foil of 15 μm in thickness serving as a current collector by a comma coater such as to have a coating weight of 11±0.5 mg/cm². The copper foil onto which the slurry composition for a negative electrode had been applied was subsequently conveyed inside an oven having a temperature of 80° C. for 2 minutes and an oven having a temperature of 110° C. for 2 minutes at a speed of 400 mm/min so as to dry the slurry composition for a negative electrode on the copper foil and thereby obtain a negative electrode web having a negative electrode mixed material layer formed on the current collector.

The negative electrode mixed material layer-side of the produced negative electrode web was subsequently roll pressed with a line pressure of 11 t (tons) in an environment having a temperature of 25±3° C. to obtain a negative electrode having a negative electrode mixed material layer density of 1.60 g/cm³.

<Preparation of Separator>

A separator made of a single layer of polypropylene (produced by Celgard, LLC.; product name: #2500) was prepared.

<Production of Lithium Ion Secondary Battery>

The positive electrode, the negative electrode, and the separator were used to produce a single-layer laminate cell (initial design discharge capacity equivalent to 30 mAh) and were arranged inside aluminum packing. The aluminum packing was subsequently filled with $LiPF_6$ solution of 1.0 M in concentration (solvent: mixed solvent of ethylene carbonate (EC)/diethyl carbonate (DEC)=3/7 (mass ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. High-temperature storage characteristics were evaluated for the obtained lithium ion secondary battery. The result is shown in Table 1.

Example 2

Composite particles, a conductive material paste, a slurry for a positive electrode mixed material layer, a positive electrode, a negative electrode, a separator, and a lithium ion secondary battery were prepared, and various evaluations were performed in the same way as in Example 1 with the exception that melamine cyanurate was used instead of melamine as a melamine compound in production of the composite particles. The results are shown in Table 1.

Upon observation of the composite particles using a scanning electron microscope, the outer surfaces of core particles formed of melamine cyanurate were confirmed to be at least partially covered by a shell portion formed of the polymer B and acetylene black.

Examples 3 and 4

Composite particles, a conductive material paste, a slurry for a positive electrode mixed material layer, a positive electrode, a negative electrode, a separator, and a lithium ion secondary battery were prepared, and various evaluations were performed in the same way as in Example 1 with the exception that the polymer B (Example 3) or the polymer C (Example 4) was used instead of the polymer A as a binder for a functional layer in production of the conductive material paste. The results are shown in Table 1.

Upon observation of the composite particles using a scanning electron microscope, the outer surfaces of core particles formed of melamine were confirmed to be at least partially covered by a shell portion formed of the polymer B and acetylene black in each of the examples.

Example 5

Composite particles, a conductive material paste, a slurry for a positive electrode mixed material layer, a positive electrode, a negative electrode, a separator, and a lithium ion secondary battery were prepared, and various evaluations were performed in the same way as in Example 1 with the exception that the bead diameter of the bead mill (produced by Ashizawa Finetech Ltd.; product name: LMZ-015) in production of the composite particles was changed from 0.5 mm to 1.0 mm so as to change the volume-average particle diameter of the melamine (core particles). The results are shown in Table 1.

Upon observation of the composite particles using a scanning electron microscope, the outer surfaces of core particles formed of melamine were confirmed to be at least partially covered by a shell portion formed of the polymer B and acetylene black.

Example 6

Composite particles, a conductive material paste, a slurry for a positive electrode mixed material layer, a positive electrode, a negative electrode, a separator, and a lithium ion secondary battery were prepared, and various evaluations were performed in the same way as in Example 1 with the exception that 25 parts of carbon nanotubes (average minor axis: 15 nm) were used instead of 50 parts of acetylene black as an inorganic material in production of the composite particles. The results are shown in Table 1.

Upon observation of the composite particles using a scanning electron microscope, the outer surfaces of core particles formed of melamine were confirmed to be at least partially covered by a shell portion formed of the polymer B and carbon nanotubes.

Example 7

Composite particles, a conductive material paste, a slurry for a positive electrode mixed material layer, a positive electrode, a negative electrode, a separator, and a lithium ion secondary battery were prepared, and various evaluations were performed in the same way as in Example 1 with the exception that 30 parts of acetylene black (volume-average particle diameter: 25 nm) and 10 parts of carbon nanotubes (average minor axis: 15 nm) were used as an inorganic material in production of the composite particles. The results are shown in Table 1.

Upon observation of the composite particles using a scanning electron microscope, the outer surfaces of core particles formed of melamine were confirmed to be at least partially covered by a shell portion formed of the polymer B, acetylene black, and carbon nanotubes.

Example 8

A conductive material paste, a slurry for a positive electrode mixed material layer, a positive electrode, a negative electrode, a separator, and a lithium ion secondary battery were prepared, and various evaluations performed in the same way as in Example 1 with the exception that composite particles produced as described below were used. The results are shown in Table 1.

<Production of Composite Particles>

After weighing out 100 parts of melamine that has been purified in the same way as in Example 1 and 1,240 parts of deionized water, a pre-dispersion (premix) thereof was produced using a Three-One Motor (produced by SHINTO Scientific Co., Ltd.; product name: BL300). A bead mill (produced by Ashizawa Finetech Ltd.; product name: LMZ-015) was then used to treat 1,340 g of the obtained pre-dispersion for 10 minutes under conditions of a bead diameter of 0.5 mm, a bead loading rate of 80%, and a circumferential speed of 12 m/s. The volume-average particle diameter of the melamine in the obtained dispersion liquid was measured. The result is shown in Table 1.

Next, the obtained dispersion liquid was supplied into a spray dryer (produced by Ohkawara Kakohki Co., Ltd.; product name: OC-16) and was spray dried using a rotating disk atomizer (diameter: 65 mm) under conditions of a rotation speed of 25,000 rpm, a hot air temperature of 150° C., and a particle collection outlet temperature of 90° C. to obtain particles (core particles) formed of melamine.

A Banbury mixer was used to perform 10 minutes of mixing of 100 parts of the obtained particles formed of melamine and 100 parts of alumina (volume-average particle diameter: 20 nm), and then a 2-propanol 5% solution of a silane coupling agent A (3-aminopropyltrimethoxysilane) was further added to the resultant mixture in an amount of 5 parts in terms of solid content of the silane coupling agent A and was mixed therewith at 80° C. for 10 minutes. The resultant mixture was subjected to 2 hours of heat treatment at 120° C. to obtain composite particles. Upon observation of the composite particles using a scanning electron microscope, the outer surfaces of core particles formed of melamine were confirmed to be at least partially covered by a shell portion formed of alumina and the silane coupling agent.

Examples 9 and 10

Composite particles, a conductive material paste, a slurry for a positive electrode mixed material layer, a positive electrode, a negative electrode, a separator, and a lithium ion secondary battery were prepared, and various evaluations were performed in the same way as in Example 1 with the exception that the amount of acetylene black used as an inorganic material in production of the composite particles was changed to 20 parts (Example 9) or 300 parts (Example 10). The results are shown in Table 2.

Upon observation of the composite particles using a scanning electron microscope, the outer surfaces of core particles formed of melamine were confirmed to be at least partially covered by a shell portion formed of the polymer B and acetylene black in each of the examples.

Example 11

A conductive material paste, a slurry for a positive electrode mixed material layer, a positive electrode, a negative electrode, a separator, and a lithium ion secondary battery were prepared, and various evaluations were performed in the same way as in Example 1 with the exception that composite particles produced as described below were used. The results are shown in Table 2.

<Production of Composite Particles>

After weighing out 100 parts of melamine that had been purified in the same way as in Example 1 and 1,240 parts of deionized water, a pre-dispersion (premix) thereof was produced using a Three-One Motor (produced by SHINTO Scientific Co., Ltd.; product name: BL300). A bead mill (produced by Ashizawa Finetech Ltd.; product name: LMZ-015) was then used to treat 1,340 g of the obtained pre-dispersion for 10 minutes under conditions of a bead diameter of 0.5 mm, a bead loading rate of 80%, and a circumferential speed of 12 m/s. The volume-average particle diameter of the melamine in the obtained dispersion liquid was measured. The result is shown in Table 2.

Next, the obtained dispersion liquid was supplied into a spray dryer (produced by Ohkawara Kakohki Co., Ltd.; product name: OC-16) and was spray dried using a rotating disk atomizer (diameter: 65 mm) under conditions of a rotation speed of 25,000 rpm, a hot air temperature of 150° C., and a particle collection outlet temperature of 90° C. to obtain particles (core particles) formed of melamine.

A Hybridization System (produced by Nara Machinery Co., Ltd.; product name: NHS-2) was supplied with 100 parts of the obtained particles formed of melamine and 50 parts of acetylene black (volume-average particle diameter: 25 nm) and was used to perform dry mixing to obtain composite particles. Upon observation of the composite particles using a scanning electron microscope, the outer surfaces of core particles formed of melamine were confirmed to be at least partially covered by a shell portion formed of acetylene black.

Example 12

A conductive material paste, a slurry for a positive electrode mixed material layer, a positive electrode, a negative electrode, a separator, and a lithium ion secondary battery were prepared, and various evaluations were performed in the same way as in Example 2 with the exception that composite particles produced as described below were used. The results are shown in Table 2.

<Production of Composite Particles>

After weighing out 100 parts of melamine cyanurate that had been purified in the same way as in Example 2 and 1,240 parts of deionized water, a pre-dispersion (premix) thereof was produced using a Three-One Motor (produced by SHINTO Scientific Co., Ltd.; product name: BL300). A bead mill (produced by Ashizawa Finetech Ltd.; product name: LMZ-015) was then used to treat 1,340 g of the obtained pre-dispersion for 10 minutes under conditions of a bead diameter of 0.5 mm, a bead loading rate of 80%, and a circumferential speed of 12 m/s. The volume-average particle diameter of the melamine cyanurate (core particles) in the obtained dispersion liquid was measured. The result is shown in Table 2.

Next, the obtained dispersion liquid was supplied into a spray dryer (produced by Ohkawara Kakohki Co., Ltd.; product name: OC-16) and was spray dried using a rotating disk atomizer (diameter: 65 mm) under conditions of a rotation speed of 25,000 rpm, a hot air temperature of 150° C., and a particle collection outlet temperature of 90° C. to obtain particles (core particles) formed of melamine cyanurate.

A Banbury mixer was used to perform 10 minutes of mixing of 100 parts of the obtained particles formed of melamine cyanurate and 45 parts of acetylene black (volume-average particle diameter: 25 nm), and then a 2-propanol 5% solution of a silane coupling agent A (3-aminopropyltrimethoxysilane) was further added to the resultant mixture in an amount of 5 parts in terms of solid content of the silane coupling agent A and was mixed therewith at 80° C. for 10 minutes. Thereafter, a temperature of 80° C. was maintained while 10 parts in terms of solid content of a water dispersion of the polymer B was added and mixed therewith for 10 minutes. The resultant mixture was subjected to 2 hours of heat treatment at 120° C. to obtain composite particles. Upon observation of the composite particles using a scanning electron microscope, the outer surfaces of core particles formed of melamine cyanurate were confirmed to be at least partially covered by a shell portion formed of the polymer B, acetylene black, and the silane coupling agent A.

Example 13

Composite particles, a conductive material paste, a slurry for a positive electrode mixed material layer, a positive electrode, a negative electrode, a separator, and a lithium ion secondary battery were prepared, and various evaluations were performed in the same way as in Example 12 with the exception that a 2-propanol 5% solution of a silane coupling agent B (γ-glycidoxypropylmethyldimethoxysilane) was used instead of the silane coupling agent A in production of the composite particles. The results are shown in Table 2.

Upon observation of the composite particles using a scanning electron microscope, the outer surfaces of core particles formed of melamine cyanurate were confirmed to be at least partially covered by a shell portion formed of the polymer B, acetylene black, and the silane coupling agent B.

Example 14

Composite particles, a conductive material paste, a slurry for a positive electrode mixed material layer, a positive electrode, a negative electrode, a separator, and a lithium ion secondary battery were prepared, and various evaluations were performed in the same way as in Example 13 with the exception that the amount of acetylene black used as an inorganic material in production of the composite particles was set as 25 parts. The results are shown in Table 2.

Upon observation of the composite particles using a scanning electron microscope, the outer surfaces of core particles formed of melamine cyanurate were confirmed to be at least partially covered by a shell portion formed of the polymer B, acetylene black, and the silane coupling agent B.

Example 15

Composite particles, a conductive material paste, a slurry for a positive electrode mixed material layer, a positive electrode, a negative electrode, a separator, and a lithium ion secondary battery were prepared, and various evaluations were performed in the same way as in Example 12 with the exception that a 2-propanol 5% solution of a titanate coupling agent (isopropyl tri(N-aminoethyl-aminoethyl) titanate) was used instead of the silane coupling agent A in production of the composite particles. The results are shown in Table 2.

Upon observation of the composite particles using a scanning electron microscope, the outer surfaces of core particles formed of melamine cyanurate were confirmed to be at least partially covered by a shell portion formed of the polymer B, acetylene black, and the titanate coupling agent.

Comparative Example 1

A slurry for a positive electrode mixed material layer, a positive electrode, a negative electrode, a separator, and a lithium ion secondary battery were prepared, and various evaluations were performed in the same way as in Example 1 with the exception that a conductive material paste produced as described below was used. The results are shown in Table 2.

<Production of Conductive Material Paste>

After weighing out 100 parts of melamine that had been purified in the same way as in Example 1, 10 parts in terms of solid content of the water dispersion of the polymer B, and 1,240 parts of deionized water, a pre-dispersion (premix) thereof was produced using a Three-One Motor (produced by SHINTO Scientific Co., Ltd.; product name: BL300). A bead mill (produced by Ashizawa Finetech Ltd.; product name: LMZ-015) was then used to treat 1,350 g of the obtained pre-dispersion for 10 minutes under conditions of a bead diameter of 0.5 mm, a bead loading rate of 80%, and a circumferential speed of 12 m/s. The volume-average particle diameter of the melamine in the obtained dispersion liquid was measured. The result is shown in Table 2.

Next, the obtained dispersion liquid was supplied into a spray dryer (produced by Ohkawara Kakohki Co., Ltd.; product name: OC-16) and was spray dried using a rotating disk atomizer (diameter: 65 mm) under conditions of a rotation speed of 25,000 rpm, a hot air temperature of 150° C., and a particle collection outlet temperature of 90° C. to obtain composite particles in which the outer surface of a core particle formed of melamine was at least partially covered by a shell portion formed of the polymer B.

In a dry room having a dew point of −40° C., 100 parts of acetylene black (BET specific surface area: 68 m$^2$/g) as a conductive material, 50 parts of the composite particles obtained as described above, 50 parts in terms of solid content of the NMP solution of the polymer A, and an appropriate amount of NMP as a solvent were stirred by a disper blade (3,000 rpm, 60 minutes) and were subsequently mixed at a circumferential speed of 8 m/s for 1 hour using a bead mill in which zirconia beads of 0.3 mm in diameter were used so as to produce a conductive material paste. Note that the conductive material paste had a solid content concentration of 15.0 mass %. Also note that a binder composition and a conductive material paste were produced at the same time through this operation.

Comparative Example 2

Composite particles, a conductive material paste, a slurry for a positive electrode mixed material layer, a positive electrode, a negative electrode, a separator, and a lithium ion secondary battery were prepared, and various evaluations were performed in the same way as in Example 1 with the exception that oxybis(benzenesulfonyl hydrazide) was used instead of melamine used as a melamine compound in production of the composite particles. The results are shown in Table 2.

In Tables 1 and 2, shown below:
"MC" indicates melamine cyanurate;
"OBSH" indicates oxybis(benzenesulfonyl hydrazide);
"AB" indicates acetylene black;
"CNT" indicates carbon nanotubes;
"Polymer A" indicates polyacrylonitrile;
"Polymer B" indicates acrylic acid-acrylamide copolymer;
"Polymer C" indicates polyvinylpyrrolidone;
"Silane A" indicates silane coupling agent A (3-aminopropyltrimethoxy silane);
"Silane B" indicates silane coupling agent B (γ-glycidoxypropylmethyldimethoxysilane); and
"Titanate" indicates titanate coupling agent (isopropyl tri(N-aminoethyl-aminoethyl) titanate).

TABLE 1

| Binder composition | Composite particles | Core particle | | Example 1 | Example 2 | Example 3 | Example 4 | Example 5 |
|---|---|---|---|---|---|---|---|---|
| | | | Foaming agent | Melamine | MC | Melamine | Melamine | Melamine |
| | | | Volume-average particle diameter [μm] | 0.15 | 0.15 | 0.15 | 0.15 | 2.00 |
| | | | Amount in composite particle [parts by mass] | 100 | 100 | 100 | 100 | 100 |
| | | Shell portion | Inorganic material Type | AB | AB | AB | AB | AB |
| | | | Volume-average particle diameter [nm] | 25 | 25 | 25 | 25 | 25 |
| | | | Average minor axis [nm] | — | — | — | — | — |
| | | | Amount in composite particle [parts by mass] | 50 | 50 | 50 | 50 | 50 |
| | | | Shell polymer Type | Polymer B | Polymer B | Polymer B | Polymer B | Polymer B |
| | | | Amount in composite particle [parts by mass] | 10 | 10 | 10 | 10 | 10 |

TABLE 1-continued

| | | | | Polymer A | Polymer A | Polymer B | Polymer C | Polymer A |
|---|---|---|---|---|---|---|---|---|
| Binder | | Type | | | | | | |
| Amount in conductive material paste | | Composite particles | | 50 | 50 | 50 | 50 | 50 |
| (per 100 parts by mass of conductive material) [parts by mass] | | Binder | | 50 | 50 | 50 | 50 | 50 |
| Safety | | | | A | B | A | A | B |
| High-temperature storage characteristics | | | | A | A | A | A | A |
| Adhesiveness | | | | A | A | B | B | A |

| | | | | | Example 6 | Example 7 | Example 8 |
|---|---|---|---|---|---|---|---|
| Binder composition | Composite particles | Core particle | Foaming agent | | Melamine | Melamine | Melamine |
| | | | Volume-average particle diameter [μm] | | 0.15 | 0.15 | 0.15 |
| | | | Amount in composite particle [parts by mass] | | 100 | 100 | 100 |
| | | Shell portion | Inorganic material | Type | CNT | AB/CNT | Alumina/Silane A |
| | | | | Volume-average particle diameter [nm] | 15 | 25 (AB) | 20 (Alumina) |
| | | | | Average minor axis [nm] | — | 15 (CNT) | — |
| | | | | Amount in composite particle [parts by mass] | 25 | 30/10 | 100/5 |
| | | | Shell polymer | Type | Polymer B | Polymer B | — |
| | | | | Amount in composite particle [parts by mass] | 10 | 10 | — |
| Binder | | | Type | | Polymer A | Polymer A | Polymer A |
| Amount in conductive material paste | | | Composite particles | | 50 | 50 | 50 |
| (per 100 parts by mass of conductive material) [parts by mass] | | | Binder | | 50 | 50 | 50 |
| Safety | | | | | A | A | B |
| High-temperature storage characteristics | | | | | A | A | A |
| Adhesiveness | | | | | A | A | A |

TABLE 2

| | | | | | Example 9 | Example 10 | Example 11 | Example 12 | Example 13 |
|---|---|---|---|---|---|---|---|---|---|
| Binder composition | Composite particles | Core particle | Foaming agent | | Melamine | Melamine | Melamine | MC | MC |
| | | | Volume-average particle diameter [μm] | | 0.15 | 0.15 | 0.15 | 0.15 | 0.15 |
| | | | Amount in composite particle [parts by mass] | | 100 | 100 | 100 | 100 | 100 |
| | | Shell portion | Inorganic material | Type | AB | AB | AB | AB/Silane A | AB/Silane B |
| | | | | Volume-average particle diameter [nm] | 25 | 25 | 25 | 25 (AB) | 25 (AB) |
| | | | | Average minor axis [nm] | — | — | — | — | — |
| | | | | Amount in composite particle [parts by mass] | 20 | 300 | 50 | 45/5 | 45/5 |
| | | | Shell polymer | Type | Polymer B | Polymer B | — | Polymer B | Polymer B |
| | | | | Amount in composite particle [parts by mass] | 10 | 10 | — | 10 | 10 |
| Binder | | | Type | | Polymer A | Polymer A | Polymer A | Polymer A | Polymer A |
| Amount in conductive material paste | | | Composite particles | | 50 | 50 | 50 | 50 | 50 |
| (per 100 parts by mass of conductive material) [parts by mass] | | | Binder | | 50 | 50 | 50 | 50 | 50 |
| Safety | | | | | B | B | A | SA | SA |
| High-temperature storage characteristics | | | | | B | A | A | A | A |
| Adhesiveness | | | | | A | A | A | A | SA |

| | | | | | Example 14 | Example 15 | Comparative Example 1 | Comparative Example 2 |
|---|---|---|---|---|---|---|---|---|
| Binder composition | Composite particles | Core particle | Foaming agent | | MC | MC | Melamine | OBSH |
| | | | Volume-average particle diameter [μm] | | 0.15 | 0.15 | 0.15 | 0.30 |
| | | | Amount in composite particle [parts by mass] | | 100 | 100 | 100 | 100 |

TABLE 2-continued

| | | | | | | |
|---|---|---|---|---|---|---|
| Shell portion | Inorganic material | Type | AB/Silane B | AB/Titanate | — | AB |
| | | Volume-average particle diameter [nm] | 25 (AB) | 25 (AB) | — | 25 |
| | | Average minor axis [nm] | — | — | — | — |
| | | Amount in composite particle [parts by mass] | 25/5 | 45/5 | — | 50 |
| | Shell polymer | Type | Polymer B | Polymer B | Polymer B | Polymer B |
| | | Amount in composite particle [parts by mass] | 10 | 10 | 10 | 10 |
| Binder | | Type | Polymer A | Polymer A | Polymer A | Polymer A |
| Amount in conductive material paste (per 100 parts by mass of conductive material) [parts by mass] | | Composite particles | 50 | 50 | 50 | 50 |
| | | Binder | 50 | 50 | 50 | 50 |
| Safety | | | SA | SA | C | C |
| High-temperature storage characteristics | | | SA | A | C | A |
| Adhesiveness | | | SA | A | A | B |

It can be seen from Tables 1 and 2 that in Examples 1 to 15 in which a positive electrode mixed material layer was produced using composite particles in each of which a core particle containing a melamine compound was covered by a shell portion containing an inorganic material, it was possible to produce a positive electrode mixed material layer that had excellent adhesiveness and a lithium ion secondary battery in which a high level of safety was ensured and that had excellent high-temperature storage characteristics.

On the other hand, it can be seen from Table 2 that safety and high-temperature storage characteristics of a lithium ion secondary battery deteriorated in Comparative Example 1 in which a positive electrode mixed material layer was produced using a melamine compound that was not covered by an inorganic material.

It can also be seen from Table 2 that safety of a lithium ion secondary battery deteriorated in Comparative Example 2 in which a positive electrode mixed material layer was produced using composite particles in each of which a core particle containing oxybis(benzenesulfonyl hydrazide) but not containing a melamine compound was covered by a shell portion containing an inorganic material.

INDUSTRIAL APPLICABILITY

According to the present disclosure, it is possible to provide composite particles for an electrochemical device and a binder composition for an electrochemical device functional layer that can ensure a high level of safety of an electrochemical device while also causing the electrochemical device to display excellent high-temperature storage characteristics.

Moreover, according to the present disclosure, it is possible to provide a conductive material paste for an electrode mixed material layer and a slurry for an electrode mixed material layer with which it is possible to produce an electrode that can ensure a high level of safety of an electrochemical device while also causing the electrochemical device to display excellent high-temperature storage characteristics.

Furthermore, according to the present disclosure, it is possible to provide an electrode for an electrochemical device that can ensure a high level of safety of an electrochemical device while also causing the electrochemical device to display excellent high-temperature storage characteristics.

Also, according to the present disclosure, it is possible to provide an electrochemical device that has a high level of safety and excellent high-temperature storage characteristics.

REFERENCE SIGNS LIST

100 composite particle for electrochemical device
110 core particle
110S outer surface of core particle
120 shell portion

The invention claimed is:

1. One or more composite particles for an electrochemical device each comprising: a core particle; and a shell portion at least partially covering an outer surface of the core particle, wherein
    the core particle contains a melamine compound represented by the following formula (I), where each A represents, independently of one another, a hydroxyl group or —NR$^1$R$^2$, where R$^1$ and R$^2$ each represent, independently of each other, a hydrogen atom, a hydrocarbon group, or a hydroxyl group-containing hydrocarbon group; when more than one R$^1$ is present in formula (I), each R$^1$ may be the same or different; and when more than one R$^2$ is present in formula (I), each R$^2$ may be the same or different,
    and the shell portion contains an inorganic material.

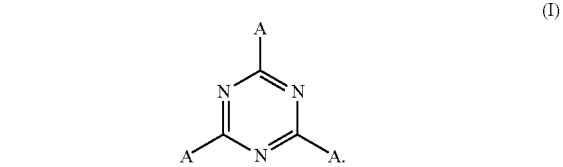

(I)

2. The composite particles for an electrochemical device according to claim 1, wherein the shell portion further contains a shell polymer.

3. The composite particles for an electrochemical device according to claim 2, wherein the shell polymer includes at least one selected from the group consisting of a carboxy group, a hydroxyl group, a nitrile group, an amino group, an epoxy group, an oxazoline group, an isocyanate group, a sulfo group, an ester group, an aldehyde group, and an amide group.

4. The composite particles for an electrochemical device according to claim 2, wherein the shell polymer includes a carboxy group and an amide group.

5. The composite particles for an electrochemical device according to claim 1, wherein the core particle has a volume-average particle diameter of not less than 0.01 μm and not more than 10.00 μm.

6. The composite particles for an electrochemical device according to claim 1, wherein the core particle has a volume-average particle diameter of not less than 0.01 μm and less than 1.00 μm.

7. The composite particles for an electrochemical device according to claim 1, wherein the inorganic material includes a carbon material.

8. The composite particles for an electrochemical device according to claim 7, wherein the carbon material includes carbon nanotubes.

9. The composite particles for an electrochemical device according to claim 1, wherein the inorganic material includes a particulate inorganic material, and the particulate inorganic material has a volume-average particle diameter of not less than 1 nm and not more than 500 nm.

10. The composite particles for an electrochemical device according to claim 1, wherein the inorganic material includes a fibrous inorganic material, and the fibrous inorganic material has an average minor axis of not less than 1 nm and not more than 500 nm.

11. The composite particles for an electrochemical device according to claim 1, wherein the inorganic material includes a coupling agent.

12. The composite particles for an electrochemical device according to claim 11, wherein the coupling agent includes a silane coupling agent.

13. A binder composition for an electrochemical device functional layer comprising: the composite particles for an electrochemical device according to claim 1; a binder for a functional layer; and a solvent.

14. The binder composition for an electrochemical device functional layer according to claim 13, wherein the binder for a functional layer is a polymer including at least one selected from the group consisting of a carboxy group, a hydroxyl group, a nitrile group, an amino group, an epoxy group, an oxazoline group, an isocyanate group, a sulfo group, an ester group, an aldehyde group, and an amide group.

15. A conductive material paste for an electrode mixed material layer comprising: the binder composition for an electrochemical device functional layer according to claim 13; and a conductive material.

16. A slurry for an electrode mixed material layer comprising: the conductive material paste for an electrode mixed material layer according to claim 15; and electrode active material particles.

17. The slurry for an electrode mixed material layer according to claim 16, wherein the electrode active material particles contain nickel.

18. An electrode for an electrochemical device comprising an electrode mixed material layer formed using the slurry for an electrode mixed material layer according to claim 16.

19. An electrochemical device comprising the electrode for an electrochemical device according to claim 18.

20. A method of producing the composite particles for an electrochemical device according to claim 1, comprising a step of granulating a composition for composite particles that contains a core material including the melamine compound and a shell material including the inorganic material.

21. A method of producing a binder composition for an electrochemical device functional layer comprising a step of mixing the composite particles for an electrochemical device according to claim 1, a binder for a functional layer, and a solvent.

22. A method of producing a conductive material paste for an electrode mixed material layer comprising:
a step of mixing the composite particles for an electrochemical device according to claim 1, a binder for a functional layer, and a solvent to obtain a binder composition for an electrochemical device functional layer; and
a step of mixing the binder composition for an electrochemical device functional layer and a conductive material.

* * * * *